US012767281B2

(12) United States Patent
Montague et al.

(10) Patent No.: US 12,767,281 B2
(45) Date of Patent: Oct. 20, 2026

(54) PROPULSION POD FOR AN ELECTRIC WATERCRAFT

(71) Applicant: Kai Concepts, LLC, Alameda, CA (US)

(72) Inventors: Donald Lewis Montague, Paia, HI (US); Joseph Andrew Brock, Alameda, CA (US); Tomasz Pawel Bartczak, Toronto (CA); Matthew Campbell Greaves, Oxley (AU); Alec Jon Korver, Alameda, CA (US); Dmitri Stepanov, Alameda, CA (US)

(73) Assignee: Kai Concepts, LLC, Alameda, CA (US)

( * ) Notice: Subject to any disclaimer, the term of this patent is extended or adjusted under 35 U.S.C. 154(b) by 887 days.

(21) Appl. No.: 17/920,657

(22) PCT Filed: Apr. 22, 2021

(86) PCT No.: PCT/US2021/028717
§ 371 (c)(1),
(2) Date: Oct. 21, 2022

(87) PCT Pub. No.: WO2021/216927
PCT Pub. Date: Oct. 28, 2021

(65) Prior Publication Data

US 2023/0150615 A1 May 18, 2023

Related U.S. Application Data

(60) Provisional application No. 63/079,826, filed on Sep. 17, 2020, provisional application No. 63/014,014, filed on Apr. 22, 2020.

(51) Int. Cl.
*B63B 32/10* (2020.01)
*B63B 1/24* (2020.01)
(Continued)

(52) U.S. Cl.
CPC .............. *B63B 32/10* (2020.02); *B63B 1/242* (2013.01); *B63B 1/246* (2013.01); *B63B 1/248* (2013.01);
(Continued)

(58) Field of Classification Search
CPC ......... B63B 1/242; B63B 1/246; B63B 1/248; B63B 32/00; B63B 32/10; B63B 32/60;
(Continued)

(56) References Cited

U.S. PATENT DOCUMENTS 1,067,392 A 7/1913 Barr
3,405,677 A 10/1968 Smith
(Continued)

FOREIGN PATENT DOCUMENTS

AU 5012101 A 12/2002
AU 200150121 A1 12/2002
(Continued)

OTHER PUBLICATIONS

International Search Report and Written Opinion for International Application No. PCT/US2021/028717 dtated Jul. 15, 2021.
(Continued)

*Primary Examiner* — Ajay Vasudeva
(74) *Attorney, Agent, or Firm* — Fitch, Even, Tabin & Flannery LLP

(57) ABSTRACT

Disclosed is a passively cooled waterproof propulsion unit for a watercraft comprising a substantially cylindrical housing including an outer wall having an external surface and an internal surface. The cylindrical housing includes a first end cap attached at a first end of the housing. The first end cap includes an attachment interface configured to be mounted to a strut of a watercraft such that at least a portion of the external surface of the outer wall of the housing is configured to contact a fluid surrounding the housing when the
(Continued)

watercraft operates within the fluid. The propulsion unit further includes an electric motor disposed within the housing and an electronic speed controller. The electronic speed controller is electrically coupled to the electric motor and configured to provide electrical power to the electric motor to operate the electric motor.

29 Claims, 20 Drawing Sheets

(51) Int. Cl.

| | |
|---|---|
| ***B63B 32/00*** | (2020.01) |
| ***B63B 32/60*** | (2020.01) |
| ***B63H 21/17*** | (2006.01) |
| ***B63H 21/21*** | (2006.01) |
| ***B63H 21/36*** | (2006.01) |
| ***H01R 13/52*** | (2006.01) |
| ***H01R 13/523*** | (2006.01) |
| ***H01R 13/629*** | (2006.01) |

(52) U.S. Cl.
CPC .............. *B63B 32/00* (2020.02); *B63B 32/60* (2020.02); *B63H 21/17* (2013.01); *B63H 21/21* (2013.01); *B63H 21/36* (2013.01); *H01R 13/5202* (2013.01); *H01R 13/521* (2013.01); *H01R 13/5219* (2013.01); *H01R 13/523* (2013.01); *H01R 13/62938* (2013.01); *B63H 2021/216* (2013.01)

(58) Field of Classification Search
CPC ...... B63H 20/007; B63H 21/17; B63H 21/21; B63H 21/36; H02K 5/10; H02K 5/12; H02K 5/124; H02K 5/1285; H02K 5/132; H01R 13/52; H01R 13/5202; H01R 13/521; H01R 13/5219; H01R 13/523
See application file for complete search history.

(56) References Cited

U.S. PATENT DOCUMENTS

| | | | | |
|---|---|---|---|---|
| 3,498,131 | A | 3/1970 | Rickey | |
| 3,515,000 | A | 6/1970 | Joseph | |
| 3,584,643 | A | 6/1971 | Burke | |
| 3,593,050 | A | 7/1971 | Ware | |
| 3,704,442 | A | 11/1972 | Wright | |
| 3,804,048 | A | 4/1974 | Cline | |
| 3,886,884 | A | 6/1975 | Stark | |
| 3,902,444 | A | 9/1975 | Stark | |
| 4,056,074 | A | 11/1977 | Sachs | |
| 4,145,927 | A | 3/1979 | Larson | |
| 4,178,871 | A | 12/1979 | Hirsch | |
| 4,382,382 | A | 5/1983 | Wang | |
| 4,517,912 | A | 5/1985 | Jones | |
| 4,676,101 | A | 6/1987 | Baughman | |
| 5,042,299 | A | 8/1991 | Wells | |
| 5,049,878 | A | 9/1991 | Stern | |
| 5,062,378 | A | 11/1991 | Bateman | |
| 5,178,089 | A | 1/1993 | Hodel | |
| 5,226,313 | A | 7/1993 | Murata | |
| 5,309,859 | A | 5/1994 | Miller | |
| 5,429,562 | A | 7/1995 | Milner | |
| 5,544,607 | A | 8/1996 | Rorabaugh | |
| 5,573,088 | A | 11/1996 | Daniels | |
| 5,719,556 | A | 2/1998 | Albin | |
| 5,726,578 | A | 3/1998 | Hook | |
| 5,735,167 | A | 4/1998 | Puukangas | |
| 5,749,018 | A | 5/1998 | Wess | |
| 5,809,926 | A | 9/1998 | Kelsey | |
| 5,848,922 | A | 12/1998 | Itima | |
| 6,095,076 | A | 8/2000 | Nesbitt | |
| 6,142,840 | A | 11/2000 | Efthymiou | |
| 6,178,905 | B1 | 1/2001 | Dynes | |
| 6,183,333 | B1 | 2/2001 | Hall | |
| 6,192,817 | B1 | 2/2001 | Dec | |
| 6,302,230 | B1 | 10/2001 | Kamen | |
| 6,311,631 | B1 | 11/2001 | Beecher | |
| 6,355,374 | B1 | 3/2002 | Wirsching | |
| 6,371,726 | B1 | 4/2002 | Jonsson | |
| 6,409,560 | B1 | 6/2002 | Austin | |
| 6,475,045 | B2 | 11/2002 | Schultz | |
| 6,568,340 | B2 | 5/2003 | Dec | |
| 6,578,506 | B2 | 6/2003 | Bieker | |
| 6,591,776 | B2 | 7/2003 | Miyazaki | |
| 6,702,634 | B2 | 3/2004 | Jung | |
| 6,743,064 | B2 | 6/2004 | Gieseke | |
| 6,848,815 | B1 | 2/2005 | Born | |
| 6,855,016 | B1 | 2/2005 | Jansen | |
| 6,901,872 | B1 | 6/2005 | Battle | |
| 6,902,446 | B1 * | 6/2005 | Healey .................. | H02K 23/66 318/599 |
| 6,962,079 | B2 | 11/2005 | Eguchi | |
| 6,966,808 | B1 | 11/2005 | Liao | |
| 7,047,901 | B2 | 5/2006 | Chen | |
| 7,089,875 | B2 | 8/2006 | Kurze | |
| 7,097,523 | B2 | 8/2006 | Woolley | |
| 7,138,774 | B2 | 11/2006 | Negoro | |
| 7,143,710 | B2 | 12/2006 | Lang | |
| 7,166,005 | B2 | 1/2007 | Tirloni | |
| 7,182,036 | B2 | 2/2007 | Levine | |
| 7,182,037 | B2 | 2/2007 | Otobe | |
| 7,226,329 | B2 | 6/2007 | Railey | |
| 7,243,607 | B2 | 7/2007 | Chesney | |
| 7,275,493 | B1 | 10/2007 | Brass | |
| 7,275,607 | B2 | 10/2007 | Kamen | |
| 7,298,056 | B2 | 11/2007 | Gizara | |
| 7,506,600 | B2 | 3/2009 | Furuya | |
| 7,601,041 | B2 | 10/2009 | McCarthy | |
| 7,731,555 | B2 | 6/2010 | Railey | |
| 7,980,191 | B2 | 7/2011 | Murphy | |
| 8,043,135 | B1 | 10/2011 | Corn | |
| 8,070,544 | B2 | 12/2011 | Roman | |
| 8,123,578 | B2 | 2/2012 | Mewis | |
| 8,166,905 | B2 | 5/2012 | Gratsch | |
| 8,262,425 | B1 | 9/2012 | Jones | |
| 8,290,636 | B2 | 10/2012 | Manning | |
| 8,312,831 | B2 | 11/2012 | Templeman | |
| 8,398,446 | B2 | 3/2013 | Railey | |
| 8,456,310 | B2 | 6/2013 | Becker | |
| 8,616,313 | B2 | 12/2013 | Simeray | |
| 8,636,552 | B2 | 1/2014 | Braden | |
| 8,702,458 | B2 | 4/2014 | Preston | |
| 8,807,250 | B2 | 8/2014 | Chen | |
| 8,851,947 | B2 | 10/2014 | Vlock | |
| 8,863,681 | B2 | 10/2014 | Howes | |
| 8,870,614 | B2 | 10/2014 | Railey | |
| 8,888,544 | B1 | 11/2014 | Guglielmo | |
| 9,051,038 | B1 | 6/2015 | Herber | |
| 9,056,654 | B1 | 6/2015 | Fraser | |
| 9,101,817 | B2 | 8/2015 | Doerksen | |
| 9,162,741 | B2 | 10/2015 | Köhnsen | |
| 9,352,660 | B2 | 5/2016 | Osawa | |
| 9,359,044 | B2 | 6/2016 | Langelaan | |
| 9,475,559 | B2 | 10/2016 | Czarnowski | |
| 9,573,656 | B2 | 2/2017 | Templeman | |
| 9,618,528 | B2 | 4/2017 | Lešikar et al. | |
| 9,643,694 | B2 | 5/2017 | Geislinger | |
| 9,645,138 | B2 | 5/2017 | Hamm | |
| 9,669,902 | B2 | 6/2017 | Geislinger | |
| 9,718,521 | B2 | 8/2017 | Derrah | |
| 9,758,962 | B2 | 9/2017 | Geislinger | |
| 9,789,935 | B1 | 10/2017 | Aguera | |
| 9,789,943 | B2 | 10/2017 | Lehmann | |
| 9,835,224 | B2 | 12/2017 | Geislinger | |
| 9,845,138 | B2 | 12/2017 | Köhnsen | |
| 9,891,620 | B2 | 2/2018 | Green | |
| 9,919,784 | B1 | 3/2018 | Fisher | |
| 9,994,296 | B1 | 6/2018 | Balogh | |
| 10,029,775 | B2 | 7/2018 | Nikmanesh | |
| 10,054,443 | B1 | 8/2018 | Patel | |
| 10,057,676 | B2 | 8/2018 | Manning | |

(56) References Cited

U.S. PATENT DOCUMENTS

| | | | | |
|---|---|---|---|---|
| 10,082,788 | B1 | 9/2018 | Dengel | |
| 10,099,754 | B2 | 10/2018 | Tian | |
| 10,110,046 | B1 | 10/2018 | Esquibel | |
| D843,303 | S | 3/2019 | Leason | |
| 10,227,120 | B2 | 3/2019 | Ajello | |
| 10,235,870 | B2 | 3/2019 | Leason | |
| 10,266,239 | B2 | 4/2019 | Fry | |
| 10,279,873 | B2 | 5/2019 | Logosz | |
| D852,112 | S | 6/2019 | Leason | |
| 10,308,336 | B1 | 6/2019 | Vermeulen | |
| D853,310 | S | 7/2019 | Leason | |
| 10,358,194 | B1 | 7/2019 | Wengreen | |
| D857,606 | S | 8/2019 | Dane | |
| 10,456,658 | B1 | 10/2019 | Doerksen | |
| D866,872 | S | 11/2019 | Liu | |
| 10,486,771 | B2 | 11/2019 | Tian | |
| 10,526,057 | B2 | 1/2020 | Kohnsen | |
| 10,532,797 | B2 | 1/2020 | Derrah | |
| 10,597,123 | B2 | 3/2020 | Bell | |
| D882,010 | S | 4/2020 | Vermillion | |
| 10,611,261 | B2 | 4/2020 | Pang | |
| 10,618,621 | B1 | 4/2020 | Rott | |
| 10,625,834 | B2 | 4/2020 | MacFarlane | |
| D883,177 | S | 5/2020 | Leason | |
| 10,647,387 | B2 | 5/2020 | Dombois | |
| 10,647,392 | B2 | 5/2020 | Trewern | |
| 10,668,987 | B1 | 6/2020 | Murphy | |
| 10,668,994 | B2 | 6/2020 | Frank | |
| 10,683,075 | B2 | 6/2020 | Schibli | |
| 10,759,503 | B2 | 9/2020 | Aguera | |
| 10,780,928 | B2 | 9/2020 | Pang | |
| 10,864,962 | B2 | 12/2020 | Pankratz | |
| 10,906,621 | B2 * | 2/2021 | Gebhart | B63H 20/007 |
| 10,946,939 | B1 | 3/2021 | Montague | |
| 11,097,822 | B2 * | 8/2021 | Aoki | B63H 11/08 |
| 11,273,364 | B1 | 3/2022 | Doerksen | |
| 11,334,079 | B2 | 5/2022 | Afman | |
| 11,383,797 | B2 | 7/2022 | Werner | |
| 11,685,481 | B2 | 6/2023 | Missler | |
| 11,703,866 | B2 | 7/2023 | Snyder | |
| 12,145,696 | B2 * | 11/2024 | Sewell | B63B 32/66 |
| 12,168,497 | B1 | 12/2024 | Nielsen | |
| 2001/0042498 | A1 | 11/2001 | Burnham | |
| 2002/0088387 | A1 | 7/2002 | Motsenbocker | |
| 2002/0090866 | A1 | 7/2002 | Hoshina | |
| 2003/0019316 | A1 | 1/2003 | Tews | |
| 2003/0033968 | A1 | 2/2003 | Thomson | |
| 2003/0089293 | A1 | 5/2003 | Vos | |
| 2003/0167991 | A1 | 9/2003 | Namanny | |
| 2006/0249513 | A1 | 11/2006 | Duke | |
| 2007/0180904 | A1 | 8/2007 | Gao | |
| 2008/0041294 | A1 | 2/2008 | Diorio | |
| 2008/0168937 | A1 | 7/2008 | Ruan | |
| 2008/0243321 | A1 | 10/2008 | Walser | |
| 2008/0268730 | A1 | 10/2008 | Heesterman | |
| 2009/0023478 | A1 | 1/2009 | Lowles | |
| 2010/0154534 | A1 | 6/2010 | Hampton | |
| 2011/0014829 | A1 | 1/2011 | Burke | |
| 2011/0056423 | A1 | 3/2011 | Railey | |
| 2011/0201238 | A1 | 8/2011 | Rott | |
| 2011/0212691 | A1 | 9/2011 | Rott | |
| 2011/0256518 | A1 | 10/2011 | Rott | |
| 2012/0126972 | A1 | 5/2012 | Rott | |
| 2013/0029547 | A1 | 1/2013 | Suzuki | |
| 2013/0157526 | A1 | 6/2013 | Martin | |
| 2013/0255560 | A1 | 10/2013 | Kinoshita | |
| 2013/0293179 | A1 | 11/2013 | Lee | |
| 2014/0053764 | A1 | 2/2014 | Ruan | |
| 2014/0141891 | A1 | 5/2014 | Georgy | |
| 2014/0232379 | A1 | 8/2014 | Nazarian | |
| 2015/0064995 | A1 | 3/2015 | Woods | |
| 2015/0340672 | A1 | 11/2015 | Walpurgis | |
| 2016/0077543 | A1 | 3/2016 | Conro | |
| 2017/0015397 | A1 | 1/2017 | Mitchell | |
| 2017/0043844 | A1 | 2/2017 | Chapman | |
| 2017/0045887 | A1 | 2/2017 | Mazin | |
| 2017/0215033 | A1 | 7/2017 | Piraino | |
| 2017/0322585 | A1 | 11/2017 | Tomita | |
| 2017/0368413 | A1 | 12/2017 | Shavit | |
| 2018/0043975 | A1 | 2/2018 | Tan | |
| 2018/0072383 | A1 | 3/2018 | Montague | |
| 2018/0099730 | A1 | 4/2018 | Riegerbauer | |
| 2018/0118311 | A1 | 5/2018 | Köhnsen | |
| 2018/0128882 | A1 | 5/2018 | Yoshiya | |
| 2018/0170493 | A1 | 6/2018 | Terada | |
| 2018/0170502 | A1 | 6/2018 | Terada | |
| 2018/0181161 | A1 | 6/2018 | Long | |
| 2018/0210485 | A1 | 7/2018 | Liang | |
| 2018/0281914 | A1 | 10/2018 | Burton | |
| 2018/0335780 | A1 | 11/2018 | Stevens | |
| 2018/0361870 | A1 | 12/2018 | Zhao | |
| 2018/0370600 | A1 | 12/2018 | Geislinger | |
| 2019/0041891 | A1 | 2/2019 | Parazynski | |
| 2019/0054990 | A1 | 2/2019 | Gebhart | |
| 2019/0061557 | A1 | 2/2019 | Quick | |
| 2019/0061880 | A1 | 2/2019 | Bousquet | |
| 2019/0137993 | A1 | 5/2019 | Bertrand | |
| 2019/0168850 | A1 | 6/2019 | Tian | |
| 2019/0168851 | A1 | 6/2019 | Tian | |
| 2019/0173138 | A1 | 6/2019 | Tian | |
| 2019/0233063 | A1 | 8/2019 | Geislinger | |
| 2019/0233076 | A1 | 8/2019 | Aldama | |
| 2019/0263484 | A1 | 8/2019 | Wilson | |
| 2019/0344662 | A1 | 11/2019 | Warren | |
| 2019/0344862 | A1 | 11/2019 | Tian | |
| 2019/0344874 | A1 | 11/2019 | Liang | |
| 2019/0389551 | A1 | 12/2019 | Aoki | |
| 2020/0018969 | A1 | 1/2020 | Ou | |
| 2020/0047849 | A1 | 2/2020 | Claughton | |
| 2020/0079479 | A1 | 3/2020 | Derrah | |
| 2020/0102052 | A1 | 4/2020 | Geislinger | |
| 2020/0148063 | A1 | 5/2020 | Dastoor | |
| 2020/0172206 | A1 | 6/2020 | Terada | |
| 2020/0172207 | A1 | 6/2020 | Wengreen | |
| 2020/0172213 | A1 | 6/2020 | Rodriguez Rondon | |
| 2020/0197826 | A1 | 6/2020 | Zhang | |
| 2020/0231264 | A1 | 7/2020 | Imai | |
| 2020/0283102 | A1 | 9/2020 | Lind | |
| 2020/0331562 | A1 | 10/2020 | Dombois | |
| 2020/0391831 | A1 | 12/2020 | Jensen | |
| 2021/0024194 | A1 | 1/2021 | Fox | |
| 2021/0107601 | A1 | 4/2021 | Trewern | |
| 2021/0272446 | A1 | 9/2021 | Cortland | |
| 2021/0323637 | A1 | 10/2021 | Leason | |
| 2021/0336461 | A1 | 10/2021 | Luthman | |
| 2021/0347442 | A1 | 11/2021 | Montague | |
| 2022/0063786 | A1 | 3/2022 | Montague | |
| 2022/0179442 | A1 | 6/2022 | Oshiro | |
| 2022/0179443 | A1 | 6/2022 | Oshiro | |
| 2022/0194525 | A1 | 6/2022 | Missler | |
| 2022/0274674 | A1 | 9/2022 | Peter | |
| 2023/0009310 | A1 | 1/2023 | Hagen | |
| 2023/0019805 | A1 | 1/2023 | Koehnsen | |
| 2023/0043251 | A1 * | 2/2023 | Rasmussen | H02K 5/132 |
| 2023/0043812 | A1 | 2/2023 | Yanai | |
| 2023/0249788 | A1 | 8/2023 | Inoue | |
| 2024/0059375 | A1 | 2/2024 | Werner | |
| 2024/0181825 | A1 | 6/2024 | Rocha | |
| 2024/0270366 | A1 | 8/2024 | Montague | |
| 2024/0326964 | A1 | 10/2024 | Inoue | |
| 2024/0326971 | A1 | 10/2024 | Inoue | |
| 2024/0326973 | A1 | 10/2024 | Inoue | |

FOREIGN PATENT DOCUMENTS

| | | | |
|---|---|---|---|
| AU | 2004100571 | A4 | 8/2004 |
| AU | 2007100530 | A4 | 9/2007 |
| AU | 2007202855 | A1 | 1/2009 |
| AU | 2013100044 | A4 | 2/2013 |
| AU | 2018390893 | A1 | 7/2020 |
| BR | 8201283 | U | 3/2004 |
| BR | 102013022366 | A2 | 8/2015 |
| CN | 2675546 | Y | 2/2005 |
| CN | 2875944 | Y | 3/2007 |

(56) References Cited

FOREIGN PATENT DOCUMENTS

CN 101012003 A 8/2007
CN 201012743 Y 1/2008
CN 201012744 Y 1/2008
CN 201023637 Y 2/2008
CN 201086813 Y 7/2008
CN 101300971 Y 11/2008
CN 201220740 Y 4/2009
CN 201291996 Y 8/2009
CN 201300970 Y 9/2009
CN 201300971 Y 9/2009
CN 201329950 Y 10/2009
CN 201331716 Y 10/2009
CN 201347194 Y 11/2009
CN 201390374 Y 1/2010
CN 201406017 Y 2/2010
CN 201406019 Y 2/2010
CN 201406020 Y 2/2010
CN 201407093 Y 2/2010
CN 201407094 Y 2/2010
CN 201415754 Y 3/2010
CN 201437400 U 4/2010
CN 201447051 U 5/2010
CN 101734354 A 6/2010
CN 101734355 A 6/2010
CN 101734356 A 6/2010
CN 101746490 A 6/2010
CN 101870343 A 10/2010
CN 101870344 A 10/2010
CN 101870346 A 10/2010
CN 101871382 A 10/2010
CN 101927817 A 12/2010
CN 201914426 U 8/2011
CN 202264871 U 6/2012
CN 202574577 U 12/2012
CN 202574578 U 12/2012
CN 101875396 B 9/2013
CN 103373451 A 10/2013
CN 103373453 A 10/2013
CN 103419908 A 12/2013
CN 203381780 U 1/2014
CN 203567910 U 4/2014
CN 203593146 U 5/2014
CN 101879934 B 9/2014
CN 104229063 A 12/2014
CN 104229088 A 12/2014
CN 204056245 U 12/2014
CN 104260845 A 1/2015
CN 104260869 A 1/2015
CN 104295419 A 1/2015
CN 104309792 A 1/2015
CN 204124333 U 1/2015
CN 204197224 U 3/2015
CN 204197225 U 3/2015
CN 204197244 U 3/2015
CN 204197245 U 3/2015
CN 204197246 U 3/2015
CN 204197248 U 3/2015
CN 204197257 U 3/2015
CN 204197259 U 3/2015
CN 204197260 U 3/2015
CN 204197261 U 3/2015
CN 204200363 U 3/2015
CN 204200365 U 3/2015
CN 204200366 U 3/2015
CN 204200367 U 3/2015
CN 204200423 U 3/2015
CN 204200424 U 3/2015
CN 204200433 U 3/2015
CN 204200443 U 3/2015
CN 204436577 U 7/2015
CN 204659986 U 9/2015
CN 103661833 B 3/2016
CN 205131588 U 4/2016
CN 105691563 A 6/2016
CN 205418042 U 8/2016
CN 205469703 U 8/2016
CN 205469704 U 8/2016
CN 104309792 B 9/2016
CN 105947135 A 9/2016
CN 105966562 A 9/2016
CN 105966563 A 9/2016
CN 105966564 A 9/2016
CN 105966565 A 9/2016
CN 106005300 A 10/2016
CN 106054707 A 10/2016
CN 205632952 U 10/2016
CN 106081001 A 11/2016
CN 205675195 U 11/2016
CN 206054103 U 3/2017
CN 104228695 B 4/2017
CN 206087218 U 4/2017
CN 106846757 A 6/2017
CN 206297715 U 7/2017
CN 206317993 U 7/2017
CN 206446772 U 8/2017
CN 206466156 U 9/2017
CN 206466161 U 9/2017
CN 206466166 U 9/2017
CN 206466174 U 9/2017
CN 206466180 U 9/2017
CN 206466191 U 9/2017
CN 206471439 U 9/2017
CN 206471884 U 9/2017
CN 206606355 U 11/2017
CN 105923116 B 1/2018
CN 107628209 A 1/2018
CN 206914584 U 1/2018
CN 206984297 U 2/2018
CN 207010363 U 2/2018
CN 107776839 A 3/2018
CN 207129115 U 3/2018
CN 107953977 A 4/2018
CN 207257921 U 4/2018
CN 207389479 U 5/2018
CN 207389513 U 5/2018
CN 108189978 A 6/2018
CN 207450184 U 6/2018
CN 207473824 U 6/2018
CN 207496901 U 6/2018
CN 207496902 U 6/2018
CN 207510694 U 6/2018
CN 207550443 U 6/2018
CN 207550444 U 6/2018
CN 207670628 U 7/2018
CN 108357650 A 8/2018
CN 207683736 U 8/2018
CN 207683737 U 8/2018
CN 104260846 B 9/2018
CN 108482604 A 9/2018
CN 108583797 A 9/2018
CN 207851575 U 9/2018
CN 108609124 A 10/2018
CN 108725709 A 11/2018
CN 108909963 A 11/2018
CN 208134578 U 11/2018
CN 208165225 U 11/2018
CN 108945331 A 12/2018
CN 108974272 A 12/2018
CN 108974298 A 12/2018
CN 208291439 U 12/2018
CN 109131766 A 1/2019
CN 109263823 A 1/2019
CN 208344507 U 1/2019
CN 208407991 B 1/2019
CN 109334888 A 2/2019
CN 109334889 A 2/2019
CN 109334890 A 2/2019
CN 208498755 U 2/2019
CN 107215436 B 3/2019
CN 208616170 U 3/2019
CN 208630821 U 3/2019
CN 109572954 A 4/2019
CN 109625200 A 4/2019
CN 208715417 U 4/2019

(56) References Cited

FOREIGN PATENT DOCUMENTS

| | | | | | |
|---|---|---|---|---|---|
| CN | 208715431 | U | | 4/2019 | |
| CN | 208715437 | U | | 4/2019 | |
| CN | 208715455 | U | | 4/2019 | |
| CN | 208760858 | U | | 4/2019 | |
| CN | 208760859 | U | | 4/2019 | |
| CN | 208760860 | U | | 4/2019 | |
| CN | 208760861 | U | | 4/2019 | |
| CN | 208760862 | U | | 4/2019 | |
| CN | 208781922 | U | | 4/2019 | |
| CN | 208789898 | U | | 4/2019 | |
| CN | 109774891 | A | | 5/2019 | |
| CN | 109795610 | A | | 5/2019 | |
| CN | 208855842 | U | | 5/2019 | |
| CN | 208915389 | U | | 5/2019 | |
| CN | 109850090 | A | | 6/2019 | |
| CN | 109895964 | A | | 6/2019 | |
| CN | 208931601 | U | | 6/2019 | |
| CN | 208931604 | U | | 6/2019 | |
| CN | 208931605 | U | | 6/2019 | |
| CN | 208931617 | U | | 6/2019 | |
| CN | 209000208 | U | | 6/2019 | |
| CN | 110039578 | A | | 7/2019 | |
| CN | 209159955 | U | | 7/2019 | |
| CN | 209176872 | U | | 7/2019 | |
| CN | 110085788 | A | | 8/2019 | |
| CN | 110171092 | A | | 8/2019 | |
| CN | 110182331 | A | | 8/2019 | |
| CN | 209253549 | U | | 8/2019 | |
| CN | 209258326 | U | | 8/2019 | |
| CN | 209258351 | | | 8/2019 | |
| CN | 209258351 | U | * | 8/2019 | |
| CN | 209258352 | U | | 8/2019 | |
| CN | 209280091 | | | 8/2019 | |
| CN | 209290629 | U | | 8/2019 | |
| CN | 107128454 | B | | 9/2019 | |
| CN | 107933845 | B | | 9/2019 | |
| CN | 110239687 | A | | 9/2019 | |
| CN | 209366402 | U | | 9/2019 | |
| CN | 209366403 | U | | 9/2019 | |
| CN | 209366404 | U | | 9/2019 | |
| CN | 209366405 | U | | 9/2019 | |
| CN | 209366406 | U | | 9/2019 | |
| CN | 209366407 | U | | 9/2019 | |
| CN | 209366408 | U | | 9/2019 | |
| CN | 209369930 | U | | 9/2019 | |
| CN | 209385232 | U | | 9/2019 | |
| CN | 209441573 | U | * | 9/2019 | ............. B63B 32/60 |
| CN | 110350341 | A | | 10/2019 | |
| CN | 110356524 | A | | 10/2019 | |
| CN | 110362080 | A | | 10/2019 | |
| CN | 209454955 | U | | 10/2019 | |
| CN | 209479921 | U | | 10/2019 | |
| CN | 110406642 | A | | 11/2019 | |
| CN | 110481728 | A | | 11/2019 | |
| CN | 209581796 | U | | 11/2019 | |
| CN | 209581797 | U | | 11/2019 | |
| CN | 209581798 | U | | 11/2019 | |
| CN | 209600753 | U | | 11/2019 | |
| CN | 110562408 | A | | 12/2019 | |
| CN | 209739293 | U | | 12/2019 | |
| CN | 209766523 | U | | 12/2019 | |
| CN | 209833934 | U | | 12/2019 | |
| CN | 209833939 | U | | 12/2019 | |
| CN | 108407991 | B | | 1/2020 | |
| CN | 110683005 | A | | 1/2020 | |
| CN | 209913096 | U | | 1/2020 | |
| CN | 209921564 | U | | 1/2020 | |
| CN | 209921565 | U | | 1/2020 | |
| CN | 209938884 | U | | 1/2020 | |
| CN | 110816758 | A | | 2/2020 | |
| CN | 110844006 | A | | 2/2020 | |
| CN | 210068712 | U | | 2/2020 | |
| CN | 110911888 | A | | 3/2020 | |
| CN | 110920812 | A | | 3/2020 | |
| CN | 110920813 | A | | 3/2020 | |
| CN | 110920847 | A | | 3/2020 | |
| CN | 210149516 | U | | 3/2020 | |
| CN | 210149517 | U | | 3/2020 | |
| CN | 210212690 | U | | 3/2020 | |
| CN | 210212691 | U | | 3/2020 | |
| CN | 110949620 | A | | 4/2020 | |
| CN | 210310790 | U | | 4/2020 | |
| CN | 210364284 | U | | 4/2020 | |
| CN | 210364287 | U | | 4/2020 | |
| CN | 210478964 | U | | 5/2020 | |
| CN | 210478965 | U | | 5/2020 | |
| CN | 210478967 | U | | 5/2020 | |
| CN | 210503084 | U | | 5/2020 | |
| CN | 210526789 | U | | 5/2020 | |
| CN | 110901869 | B | | 6/2020 | |
| CN | 111268038 | A | | 6/2020 | |
| CN | 111284636 | A | | 6/2020 | |
| CN | 210806779 | U | | 6/2020 | |
| CN | 210852818 | U | | 6/2020 | |
| CN | 210971446 | U | | 7/2020 | |
| CN | 211018557 | U | | 7/2020 | |
| CN | 211126279 | U | | 7/2020 | |
| CN | 211139588 | U | | 7/2020 | |
| CN | 211336359 | U | | 8/2020 | |
| CN | 211364859 | U | | 8/2020 | |
| CN | 109795610 | B | | 11/2020 | |
| DE | 3634775 | | | 4/1988 | |
| DE | 10103126 | | | 9/2002 | |
| DE | 202006000210 | U1 | | 3/2006 | |
| DE | 202007003106 | U1 | | 7/2007 | |
| DE | 202010000559 | U1 | | 6/2010 | |
| DE | 102010032014 | A1 | | 1/2012 | |
| DE | 202013007100 | U1 | | 9/2013 | |
| DE | 202014006552 | U1 | | 11/2014 | |
| DE | 102014005314 | A1 | | 10/2015 | |
| DE | 202017107819 | U1 | | 1/2018 | |
| DE | 202017107820 | U1 | | 1/2018 | |
| DE | 202017107821 | U1 | | 1/2018 | |
| DE | 202017107824 | U1 | | 1/2018 | |
| DE | 202017107826 | U1 | | 1/2018 | |
| DE | 102018113137 | A1 | | 2/2019 | |
| DE | 102017130946 | A1 | | 6/2019 | |
| DE | 102017130949 | A1 | | 6/2019 | |
| DE | 102017130955 | A1 | | 6/2019 | |
| DE | 102017130959 | A1 | | 6/2019 | |
| DE | 102017130963 | A1 | | 6/2019 | |
| DE | 102017130966 | A1 | | 6/2019 | |
| DE | 102018100696 | A1 | | 6/2019 | |
| DE | 102018129501 | A1 | | 9/2019 | |
| DE | 202019103496 | U1 | | 9/2019 | |
| DE | 202018104741 | U1 | | 11/2019 | |
| DE | 102018215176 | A1 | | 3/2020 | |
| DE | 102018127650 | A1 | | 5/2020 | |
| EP | 1538074 | | | 6/2005 | |
| EP | 1538074 | A1 | | 6/2005 | |
| EP | 2693284 | | | 2/2014 | |
| EP | 1955025 | B1 | | 3/2017 | |
| EP | 3526112 | A1 | | 8/2019 | |
| EP | 3526113 | A1 | | 8/2019 | |
| EP | 3529142 | A1 | | 8/2019 | |
| EP | 3529143 | A1 | | 8/2019 | |
| EP | 3552947 | A1 | | 10/2019 | |
| EP | 3640882 | A1 | | 4/2020 | |
| EP | 3747754 | | | 12/2020 | |
| EP | 4180316 | A | | 5/2023 | |
| ES | 1153639 | Y | | 7/2016 | |
| FR | 3078680 | B1 | | 5/2020 | |
| GB | 2132773 | | | 7/1984 | |
| GB | 2580022 | A | | 7/2020 | |
| GB | 2627370 | A | | 8/2024 | |
| IN | 20070139612 | | | 7/2008 | |
| JP | 2002154479 | A | | 5/2002 | |
| JP | 2002193185 | A | | 7/2002 | |
| JP | 2008189169 | A | | 8/2008 | |
| JP | 2008230315 | A | | 10/2008 | |
| JP | 2009018702 | A | | 1/2009 | |
| JP | 2010173405 | A | | 8/2010 | |
| JP | 3163820 | U | | 11/2010 | |
| JP | 4640760 | B2 | | 3/2011 | |

(56) References Cited

FOREIGN PATENT DOCUMENTS

| | | | |
|---|---|---|---|
| JP | 3183445 | U | 5/2013 |
| JP | 5221737 | B2 | 6/2013 |
| JP | 2014043150 | A | 3/2014 |
| JP | 5791376 | B2 | 10/2015 |
| JP | 2015177735 | | 10/2015 |
| JP | 2020111331 | A | 7/2020 |
| KR | 100560702 | B1 | 3/2006 |
| KR | 100572804 | B1 | 4/2006 |
| KR | 100581491 | B1 | 5/2006 |
| KR | 20090006619 | A | 1/2009 |
| KR | 20090098306 | A | 9/2009 |
| KR | 20100010874 | U | 11/2010 |
| KR | 101024595 | B1 | 3/2011 |
| KR | 200454353 | Y1 | 6/2011 |
| KR | 101491661 | B1 | 2/2015 |
| KR | 20160027555 | A | 3/2016 |
| KR | 20160057060 | A | 5/2016 |
| KR | 101697338 | B1 | 1/2017 |
| KR | 20170000622 | | 1/2017 |
| KR | 101713936 | B1 | 3/2017 |
| KR | 101767476 | B1 | 8/2017 |
| KR | 20170090702 | A | 8/2017 |
| KR | 101857099 | B1 | 5/2018 |
| KR | 20190063727 | A | 6/2019 |
| KR | 101978043 | B1 | 8/2019 |
| KR | 102052195 | B1 | 12/2019 |
| KR | 102050718 | B1 | 1/2020 |
| KR | 200490972 | | 1/2020 |
| KR | 102095292 | B1 | 3/2020 |
| KR | 102095294 | B1 | 3/2020 |
| KR | 102103228 | B1 | 4/2020 |
| KR | 102103229 | B1 | 4/2020 |
| KR | 102116532 | B1 | 6/2020 |
| KR | 102133778 | B1 | 7/2020 |
| NO | 20181547 | A1 | 6/2020 |
| TW | M257328 | U | 2/2005 |
| TW | M308901 | U | 4/2007 |
| TW | 200848320 | A | 12/2008 |
| TW | 201000361 | A | 1/2010 |
| TW | 1334793 | B | 12/2010 |
| TW | M461592 | U | 9/2013 |
| TW | 1605324 | B | 11/2017 |
| TW | M552465 | U | 12/2017 |
| WO | 2002092420 | A1 | 11/2002 |
| WO | 2005058685 | A1 | 6/2005 |
| WO | 2006014085 | A1 | 2/2006 |
| WO | 2006042359 | A1 | 4/2006 |
| WO | 2007072185 | A2 | 6/2007 |
| WO | 2008022863 | | 2/2008 |
| WO | 2009144400 | A2 | 12/2009 |
| WO | 2011047431 | A1 | 4/2011 |
| WO | 2011049470 | | 4/2011 |
| WO | 2012013770 | A2 | 2/2012 |
| WO | 2013026714 | A1 | 2/2013 |
| WO | 2015033032 | | 3/2015 |
| WO | 2015039970 | A1 | 3/2015 |
| WO | 2016003121 | A1 | 1/2016 |
| WO | 2017069322 | A1 | 4/2017 |
| WO | 2017091537 | A1 | 6/2017 |
| WO | 2017153338 | A1 | 9/2017 |
| WO | 2017221233 | A1 | 12/2017 |
| WO | 2018149044 | A1 | 8/2018 |
| WO | 2018234969 | A1 | 12/2018 |
| WO | 2019072196 | A1 | 4/2019 |
| WO | 2019073126 | A1 | 4/2019 |
| WO | 2019122087 | A1 | 6/2019 |
| WO | 2019122091 | A1 | 6/2019 |
| WO | 2019122098 | A1 | 6/2019 |
| WO | 2019122176 | A1 | 6/2019 |
| WO | 2019122185 | A1 | 6/2019 |
| WO | 2019122225 | A1 | 6/2019 |
| WO | 2019122321 | A1 | 6/2019 |
| WO | 2019141799 | A1 | 7/2019 |
| WO | 2019203135 | A1 | 10/2019 |
| WO | 2019222119 | A1 | 11/2019 |
| WO | 2020042299 | A1 | 3/2020 |
| WO | 2020042300 | A1 | 3/2020 |
| WO | 2020042301 | A1 | 3/2020 |
| WO | 2020042302 | A1 | 3/2020 |
| WO | 2020056822 | A1 | 3/2020 |
| WO | 2020056823 | A1 | 3/2020 |
| WO | 2020107665 | A1 | 6/2020 |
| WO | 2020113768 | A1 | 6/2020 |
| WO | 2020176033 | A1 | 9/2020 |
| WO | 2021191729 | | 9/2021 |
| WO | 2022037809 | | 2/2022 |
| WO | 2022174296 | | 8/2022 |
| WO | 2022265968 | | 12/2022 |
| WO | 2023094668 | A | 6/2023 |
| WO | 2024170899 | A | 8/2024 |

OTHER PUBLICATIONS

European Extended Search Report for European Application No. 21792431.5 dated May 23, 2024.

7M Engineering, "Assembly 1," https://vimeo.com/361237245, Sep. 20, 2019.

Asa Bonthelius, "Hoglage," BATNYTT (Sep. 2009).

Autodesk Instructables, "Building an Arduino Water Level Detection Sensor," presently believed to be publicly available at least before Mar. 20, 2023, 7 pages.

Evolo Final Report, Apr. 23, 2009.

JetSurfing Nation jet boards & efoils, "Awake RAVIK Premium Electric Surfboard—unboxing and review Part 1," https://www.youtube.com/watch?v=i3P9NWw4fpg, Oct. 1, 2019.

Level Hydrofoils, Wayback Machine, Archive of https://www.levelfoils.com/technology , dated Sep. 29, 2022, 7 pages.

Omron, "Technical Explanation for Level Controllers," presently believed to be publicly available at least before Mar. 20, 2023, 31 pages.

Ray Vellinga, "Hydrofoil—Thrilling Swedish Invention, " https://www.youtube.com/watch?V=kIAggNlir9A&feature=youtu.be, Oct. 27, 2011.

Scrapheaper, "Trampofoil—the originals* from Sweden," https://www.youtube.com/watch?v=QQvYogFP9mw&feature=youtu.be, Aug. 15, 2010.

Taaroa Hydrofoil, Wayback Machine, Archive of https://www.taaroa-hydrofil.com/iup-product dated Dec. 2, 2022, 5 pages.

Zapata Racing, Manuel Kit Electronique Wireless, Believed to be publicly available before Sep. 12, 2016, 37 pages.

* cited by examiner

PROPULSION POD FOR AN ELECTRIC WATERCRAFT

CROSS-REFERENCE TO RELATED APPLICATIONS

This application is a U.S. National Stage Entry of International Application No. PCT/US2021/28717, filed Apr. 22, 2021, now published as WO 2021/216927, which claims the benefit of U.S. Provisional Application No. 63/079,826 filed Sep. 17, 2020 and U.S. Provisional Application No. 63/014,014 filed Apr. 22, 2020, which are incorporated herein by reference in their entirety. The related U.S. application Ser. No. 17/077,784 filed Oct. 22, 2020, now issued as U.S. Pat. No. 10,946,939; U.S. application Ser. No. 17/162,918 filed Jan. 29, 2021; now issued as U.S. Pat. No. 11,091,232; U.S. application Ser. No. 17/077,949 filed Oct. 22, 2020; now issued as U.S. Pat. No. 11,084,556; the application titled "BATTERY FOR USE IN A WATERCRAFT" filed concurrently herewith on Apr. 22, 2021 as international Application Number PCT/US21/28716, now published as WO 2021/216926; and the application titled "WATERCRAFT DEVICE WITH HYDROFOIL AND ELECTRIC PROPULSION SYSTEM" filed concurrently herewith on Apr. 22, 2021 as U.S. application Ser. No. 17/238,085, now published as U.S. Publication Number 2021/0347442, are incorporated herein by reference in their entirety.

FIELD

This disclosure relates to passively cooled, watertight propulsion systems for watercraft.

BACKGROUND

Electric motors have increasingly been used to drive watercraft as an alternative to gas-powered motors. These electric motors are included in a propulsion system of the watercraft and used to turn a propeller or an impeller of a waterjet to propel the watercraft forward and/or in reverse. Electronic speed controllers (ESCs) are used to control the electrical power provided to the electric motor to control the performance of the electric motor. In use, both the ESC and the electric motor generate a significant amount of heat. To reduce the likelihood of overheating the ESC and/or the electric motor during extended use, the ESC and the electric motor are often placed such that they are thermally isolated from one another so that the collective heat of the ESC and the electric motor does not cause overheating and can be more readily dissipated.

Some watercrafts, such as a hydrofoiling watercraft disclosed in U.S. Pat. No. 10,940,917, include a strut extending below the surface of the water. The electric motor may be contained in a propulsion pod and attached to the strut to drive a propulsion unit (e.g., propeller or waterjet) of the watercraft. To avoid overheating the ESC, the ESC is often positioned within the portion of the watercraft above the water and apart from the electric motor. The ESC may communicate with the electric motor via wires extending along the length of the strut. The inventors have identified electrical noise as a problem that arises with this arrangement. Wires extending from a power source to the electric motor along the length of the strut emit a significant amount of electromagnetic noise that may affect other electrical signals of the watercraft.

The inventors have identified serviceability as another problem with existing hydrofoiling watercrafts. In existing designs the propulsion pod is not serviceable or replaceable in the field, for example, to remove, repair or replace the electric motor and/or the propulsion pod in the water or on the shore. For example, the wires extending along the strut and into the known propulsion pods cannot be readily disconnected from the propulsion pod. Moreover, many existing propulsion pods are not watertight when detached from the strut and/or the wires are disconnected from the propulsion pod. Removing the wires breaches the watertight seal s that protect the contents of the housing. Attempting to service such existing propulsion pods in the field subjects the propulsion pod and the electric motor to damage from fluids and other debris. Thus, there exists a need for an apparatus that enables the propulsion pod to be disconnected from the watercraft in "the field" (e.g., when the watercraft remains in a wet or otherwise harsh environment) without damaging the watercraft, the propulsion pod, or the electric motor.

The inventors have also identified that the use of known cable glands to attach the wires to the propulsion pod does not provide sufficient sealing over time as the cable jacket loses its elasticity. Once the cable jacket has plastically deformed, the cable glands is not able to provide a sufficient seal, especially in applications where the pod is submerged underwater and subject to increased pressures due to depth. As mentioned, motors create heat within the known propulsion pods. Because the propulsion pod is a seal ed vessel, an increase in temperature within the propulsion pod causes a corresponding increase in pressure of the air within the seal ed vessel. A system of seal s is therefore needed that maintains its integrity despite these expected pressure changes within the propulsion pod.

SUMMARY

Generally speaking and pursuant to these various embodiments, a passively cooled waterproof propulsion unit for a watercraft is provided comprising a substantially cylindrical housing including an outer wall having an external surface and an internal surface. The cylindrical housing including a first end cap attached at a first end of the housing. The first end cap includes an attachment interface configured to be mounted to a strut of a watercraft such that at least a portion of the external surface of the outer wall of the housing is configured to contact a fluid surrounding the housing when the watercraft operates within the fluid. The propulsion unit further includes an electric motor disposed within the housing and an electronic speed controller. The electronic speed controller is electrically coupled to the electric motor and configured to provide electrical power to the electric motor to operate the electric motor. The electronic speed controller includes a plurality of transistors that are positioned within the housing such that the plurality of transistors are proximate the internal surface of the outer wall of the housing.

In another described example, the housing of the propulsion unit includes an internal wall that defines a first compartment and a second compartment within the housing. The first compartment contains the electronic speed controller and the second compartment contains the motor. A portion of a shaft of the motor extends through the internal wall into the first compartment.

In another described example, the electronic speed controller includes a circuit board to which the plurality of transistors are mounted. A thermally conductive layer is affixed to a side of the circuit board and in thermal contact with the internal surface of the housing.

An electric watercraft is also provided comprising a flotation portion, a strut, and a waterproof propulsion system. The strut has an upper end coupled to the flotation portion. The waterproof propulsion system is mounted to the strut and includes a housing containing an electric motor and an electronic speed controller. The electric motor has a shaft that includes a magnet coupled thereto. The electronic speed controller is positioned adjacent an end of the electric motor. The electronic speed controller is electrically coupled to the electric motor and configured to provide electrical power to the electric motor to operate the electric motor. A sensor is mounted to a circuit board of the electronic speed controller and configured to capture data associated with the orientation of the magnet coupled to the shaft of the electric motor. The sensor may provide the data to the electronic speed controller via an electrical pathway of the circuit board or via another conductor. The electronic speed controller is configured to determine a rotational position of the shaft based on the data from the sensor. The electronic speed controller is further configured to adjust the electrical power provided to the electric motor based at least in part on the rotational position of the shaft.

DETAILED DESCRIPTION

A propulsion unit is disclosed herein that allows both a motor and an electronic speed controller (ESC) to be housed within a single pod. The motor and the ESC may be tightly packed and in close proximity to one another. The propulsion unit of this disclosure permits the motor and the ESC to be in thermal communication with one another, whereas existing systems thermally isolate the motor and the ESC to avoid overheating. The propulsion unit is watertight and may be used to propel a watercraft through the water. The propulsion unit may be submerged during use and passively cooled by dissipating the heat generated from the ESC and the motor to the surrounding water.

The propulsion unit may include a housing including an outer wall having an external surface and an internal surface. The housing may be substantially cylindrical and streamlined to reduce the drag of the propulsion unit as the propulsion unit moves through the water. The housing includes a first end cap attached at a first end of the housing. The first end cap includes an attachment interface configured to be mounted to a watercraft, for example, the strut of a watercraft. The housing extends from the watercraft such that at least a portion of the external surface of the outer wall of the housing is configured to contact a fluid surrounding the housing when the watercraft operates within the fluid. The propulsion unit includes an electric motor disposed within the housing. The propulsion unit further includes an ESC electrically coupled to the electric motor and configured to provide electrical power to the electric motor to operate the electric motor. The ESC includes a plurality of transistors that are positioned within the housing such that the plurality of transistors are proximate the internal surface of the outer wall of the housing.

In some examples, the housing includes an internal wall that defines a first compartment and a second compartment within the housing. The first compartment contains the ESC and the second compartment contains the motor. In some examples, the transistors of the ESC are in thermal contact with the internal wall, so that heat generated by the conductors is conducted through the internal wall to the outer wall of the housing. In some examples a portion of a shaft of the motor extends through the internal wall into the first compartment containing the ESC. The shaft extending through the internal wall may include a magnet coupled thereto. The ESC may include a sensor positioned to capture rotational position data of the shaft and motor based on the orientation of the magnet as the shaft rotates. The ESC may use the captured rotational position data to improve the performance of the motor and reduce the noise generated by the motor.

Figure 1A:
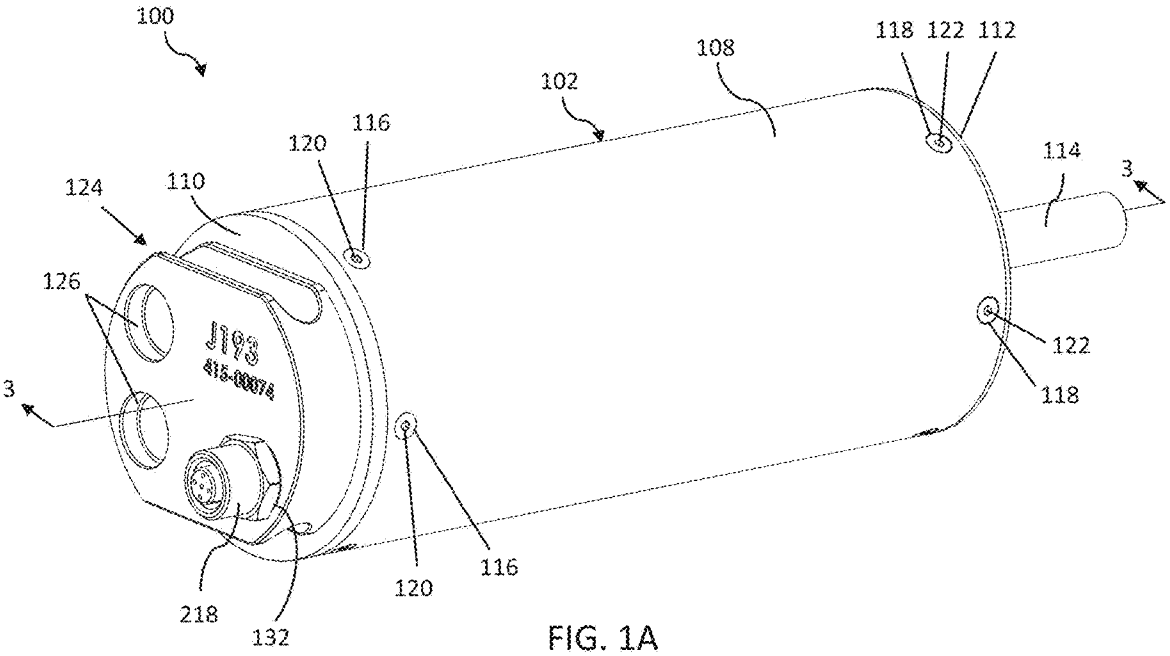
FIG. 1A is a top perspective view of a propulsion pod according to an embodiment of this disclosure.
Figure 1B:
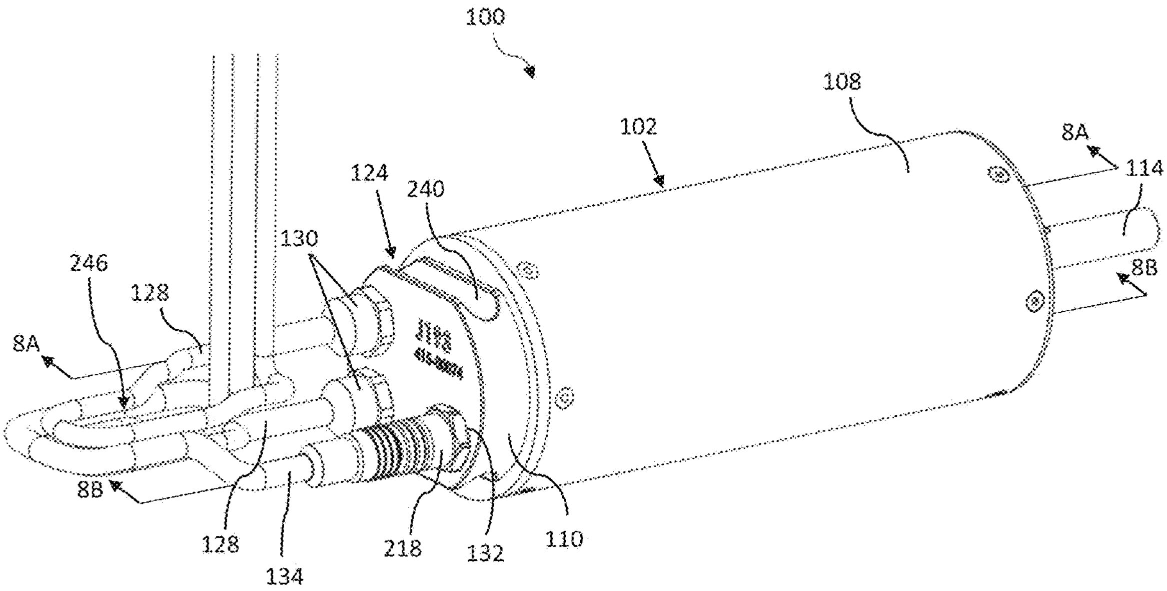
FIG. 1B is a top perspective view of the propulsion pod of FIG. 1A including wires and cables attached.
Figure 2:
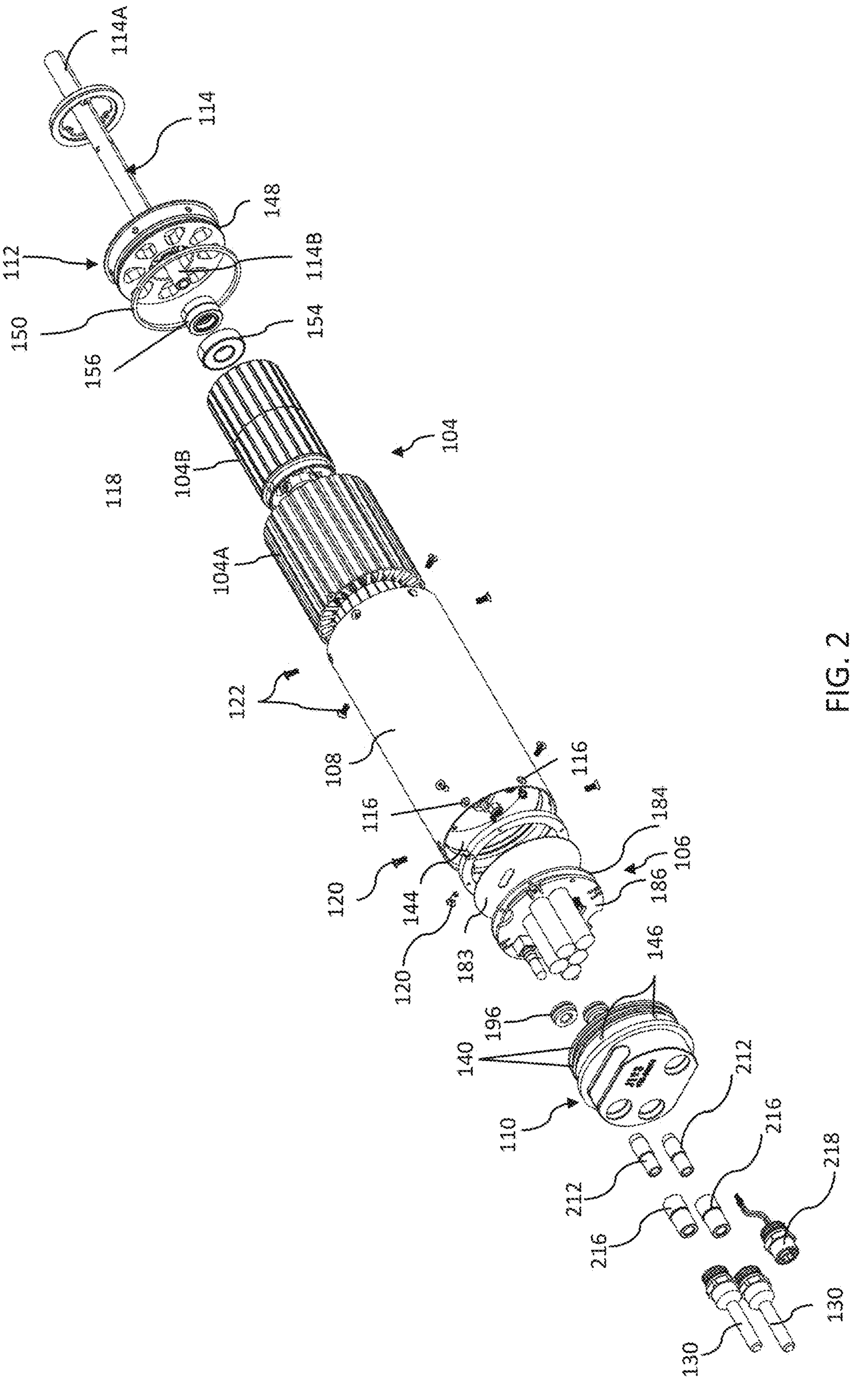
FIG. 2 is an exploded view of the propulsion pod of FIG. 1A.

With reference to FIGS. 1A-2, a propulsion unit 100 or propulsion pod is shown. The propulsion unit 100 includes a housing 102 that contains an electric motor 104 and an electronic speed controller (ESC) 106. The housing 102 is formed of a substantially cylindrical outer wall 108, a front end cap 110, and a rear end cap 112 through which a shaft 114 of the motor 104 extends. The outer wall 108 may be formed of a metal including aluminum, steel, and composites thereof or other materials having high thermal conductivity properties and suitable corrosion resistance. The outer wall 108 includes a plurality of attachment hole s 116 at the front end of the housing 102 for attachment to the front end cap 110 and a plurality of attachment hole s 118 at the rear end of the housing for attachment to the rear end cap 112. Fasteners 120 may be extended through the attachment hole s 116 to secure the front end cap 110 to the outer wall 108. Similarly, fasteners 122 may be extended through the attachment hole s 118 to secure the rear end cap 112 to the outer wall 108. While the outer wall 108 is shown as a cylindrical wall, in other embodiments the outer wall may have other shapes such as, for example, conical, teardrop, and other streamlined hydrodynamic shapes.

The front end cap 110 includes an attachment interface 124 for mounting the propulsion unit 100 to a watercraft, for example, the hydrofoiling watercraft 300 shown in FIG. 10A-D. The front end cap 110 defines hole s 126 through which power may be provided to the ESC 106 and electric motor 104. The ends of the power wires 128 may be attached to connectors 130 that may be attached to the front end cap 110 as shown in FIG. 1B. The front end cap 110 further defines a hole 132 through which the communication cable 134 may be connected to the ESC 106. As shown in FIG. 1A, a connector receptacle 218 may be positioned within the hole 132 of the front end cap 110. As shown in FIG. 1B, the communication cable 134 may be connected to the connector receptacle 218 to provide and receive communication signals to the ESC 106 via the communication cable 134.

Figure 3:
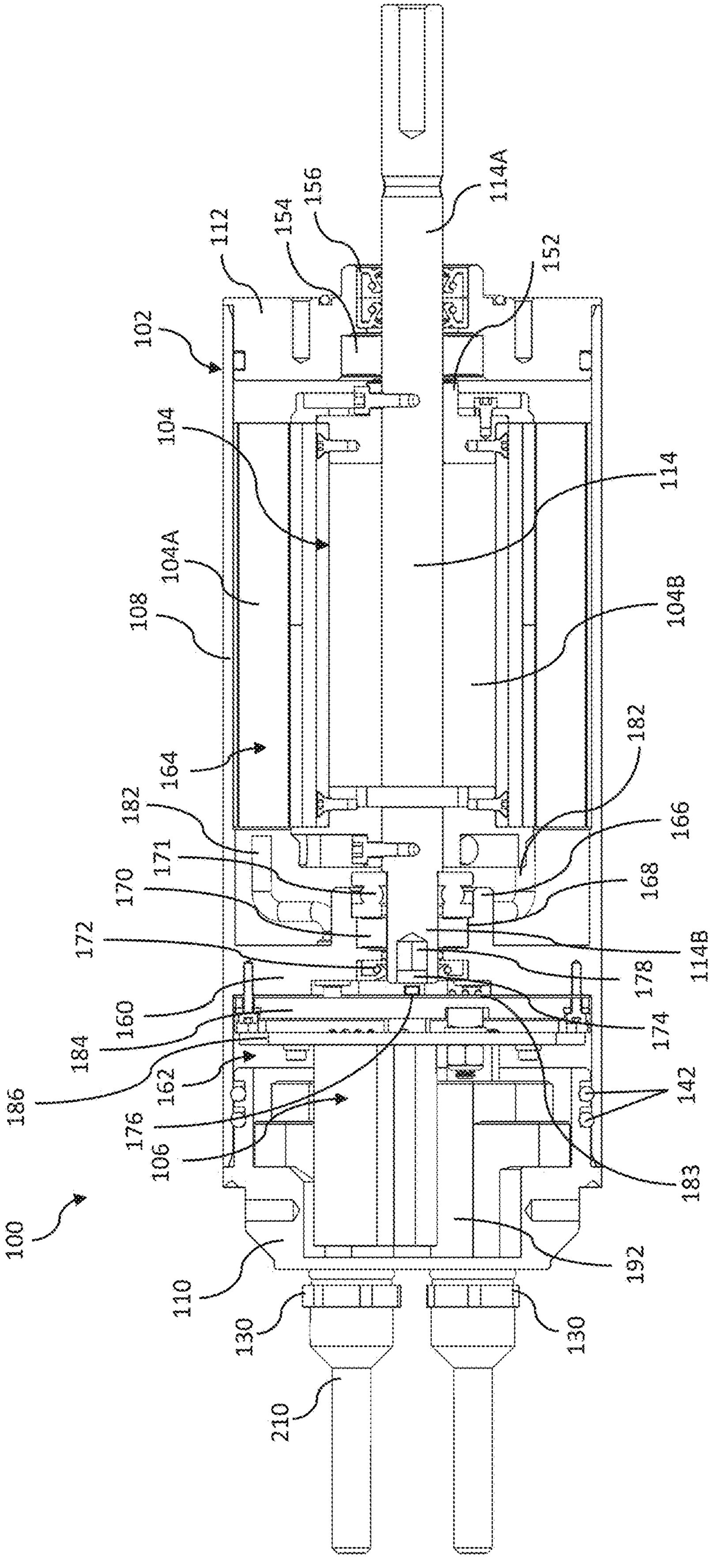
FIG. 3 is a cross-sectional view of the propulsion pod of FIG. 1A taken along lines 3-3 of FIG. 1A.

The front end cap 110 forms a watertight connection with the outer wall 108. As shown in FIGS. 2 and 3, the front end cap 110 defines grooves 140 for receiving seal s 142 (e.g., O-rings or X-rings). The seal s 142 may be received and retained within the grooves 140. When the front end cap 110 is secured to the outer wall 108, the seal s 142 extend about the periphery of the front end cap 110 between the front end cap 110 and the internal surface 144 of the outer wall 108 to form a fluid tight connection between the front end cap 110 and the outer wall 108. While this embodiment shows the use of two seal s 142 for redundancy, in other embodiments, a single seal 142 may be used. The front end cap 110 further defines attachment hole s 146 for receiving the fasteners 120 to secure the front end cap 110 to the outer wall 108.

The rear end cap 112 also forms a watertight connection with the outer wall 108. The rear end cap 112 defines a groove 148 for receiving and retaining a seal 150 (e.g., an O-ring or X-ring). When the rear end cap 112 is secured to the outer wall 108, the seal 150 extends about the periphery of the rear end cap 112 between the rear end cap 112 and the internal surface 144 of the outer wall 108 to form a fluid tight connection therebetween.

The rear end cap 112 defines a central opening 152 through which an end 114A of the shaft 114 of the motor 104 extends out of the housing 102. A propeller or an impeller may be coupled to the end 114A of the shaft 114 such that the propeller or impeller is rotated by the motor 104 during operation to propel the propulsion unit 100 and the associated watercraft through the water (see FIG. 10A-D). In some forms, the propeller is coupled directly to the shaft 114. In other forms, the shaft 114 is not directly coupled to the propeller, but turns the propeller via a gear system. In forms having gears, the shaft 114 turns the gears which causes the propeller to rotate. In yet other forms, the shaft 114 may be coupled to the propeller via clutch mechanism, permitting the propeller to rotate when the motor is not operating. The rear end cap 112 includes a bearing 154 and a rotary seal 156 positioned within the central opening 152. The bearing 154 supports the shaft 114 of the motor 104 and permits the shaft 114 to turn freely within the central opening 152 of the rear end cap 112. The rotary seal 156 is positioned within the rear portion of the central opening 152 of the rear end cap 112. The rotary seal 156 extends between the portion of the rear end cap 112 forming the central opening 152 and the shaft 114. The rotary seal 156 permits the shaft 114 to turn freely therein, while providing a fluid tight seal between the rear end cap 112 and the shaft. This prevents fluid from passing into the housing 102 along the shaft 114. The rear end cap 112 further may define hole s for receiving the fasteners 122 to secure the rear end cap 114 to the outer wall 108.

Figure 4A:
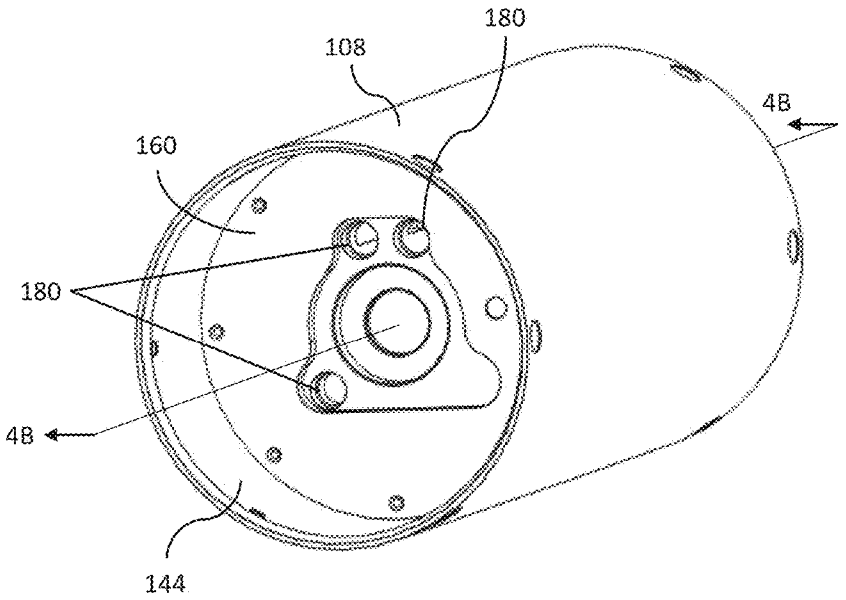
FIG. 4A is a front perspective view of a portion of the housing of the propulsion pod of FIG. 1A.
Figure 4B:
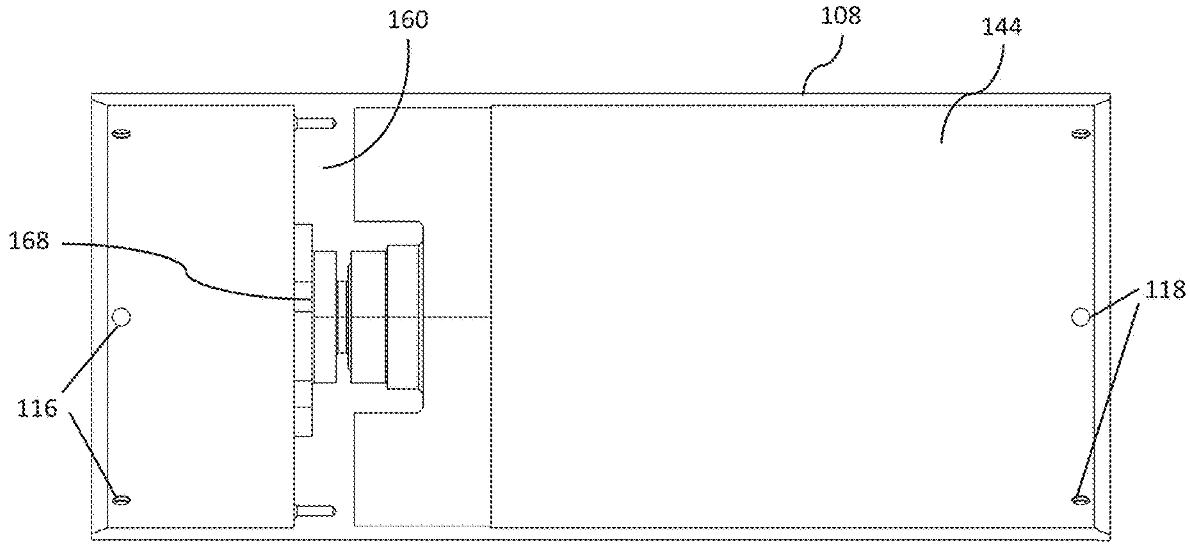
FIG. 4B is a cross-sectional view of the portion of the housing of FIG. 4A taken along lines 4B-4B of FIG. 4A.

With respect to FIGS. 3-4B, the housing 102 includes an internal wall 160 forming a first compartment 162 and a second compartment 164 within the housing 102. The internal wall 160 may be formed of a metal including aluminum, steel, or composites thereof or other materials having high thermal conductivity properties and suitable corrosion resistance. The internal wall 160 is in thermal communication with the outer wall 108 such the internal wall 160 conducts heat to the outer wall 108. The internal wall 160 may be formed integrally with the outer wall 108 such that the outer wall 108 and the internal wall 160 are unitary. In another embodiment, the internal wall 160 is formed separately and press fit within the interior of the outer wall 108. In some forms, the internal wall 160 may be pressed into the interior of the outer wall 108 and permanently affixed to the outer wall 108 by, for example, friction welding.

The first compartment 162 is sized to contain the ESC 106 and the second compartment is sized to contain the motor 104 with minimal unused space. Minimizing the amount of unused space within the housing 102 minimizes the amount of air that is seal ed within the housing 102. This reduces the amount of air that is able to expand within the housing 102 when the propulsion unit 100 operates, minimizing the fluctuation in the pressure within the housing 102 as the propulsion unit 100 generates heat and cools. Moreover, since the housing 102 is submerged in fluid during operation, the housing 102 conducts the heat generated by the ESC 106 and the motor 106 to the fluid. This tightly packed propulsion unit 100 configuration aids to decrease the distance from the components of the propulsion unit 100 to the housing 102, which preferably improves the conduction of heat to the fluid via the housing 102. Additionally, having a first compartment 162 with minimal unused space minimizes the increase in length of the propulsion unit 100 associated with including the ESC 106 within the propulsion unit 100. Also, having a tightly packed housing 102 enables shorter wires to be used which may reduce the electrical noise produced by the ESC 106 and the motor 102. Having an outer wall 108 formed of a single member without any gaps further aids to keep the electromagnetic noise of the motor 104 and ESC 106 from escaping the housing through gaps between separate component parts. This reduction of the electrical noise of the propulsion unit 100 may be beneficial in reducing the electromagnetic interference with wire less communications of the watercraft or wire less controller during operation of the propulsion unit 100.

The motor 104 may include a stator 104A and a rotor 104B. The rotor 104B may be positioned to rotate within the stator 104A. The stator 104A is positioned in thermal contact with the outer wall 108. Thus as the stator 104A of the motor 104 generates heat, the heat may be conducted to the outer wall 108 and into the fluid surrounding the housing 102.

The internal wall 160 includes a central hub 166 defining a central opening 168 through which an end 114B of the shaft 114 extends toward the first compartment 162. An axial thrust bearing 170 and a radial bearing 171 may be positioned within the hub 166. The radial bearing 171 supports the end of the shaft 114 extending through the internal wall 160 and permits the shaft 114 to turn freely within the central opening 168. A second rotary seal 172 is positioned within the central opening 168 and about the shaft 114. The rotary seal 172 extends between the internal wall 160 and the shaft 114 to provide a fluid tight seal between the internal wall 160 and the shaft 114, while permitting the shaft 114 to turn freely therein. The rotary seal 172 prevents fluid from passing between the first compartment 162 and the second compartment 164. Thus, if any of the seal s of the housing 102 fail and/or water enters with the first compartment 162 or the second compartment 164, the fluid is inhibited from passing into the other compartment. For example, if fluid enters the first compartment 162 potentially damaging the ESC 106, the electric motor 104 may remain seal ed from the fluid and undamaged. Similarly, if fluid enters the second compartment 164 potentially damaging the motor 104, the ESC 106 may remain seal ed from the fluid in the second compartment 164 and remain undamaged.

The end 114B of the shaft 114 includes a magnet 174 affixed thereto as part of a magnetic encoder system. The magnet 174 is placed such that it indicates the orientation or rotational position of the shaft 114 of the motor 104 as the shaft 114 rotates. The ESC 106 may include a sensor 176 (e.g., a magnetic sensor or Hall element) positioned to collect data regarding the rotational position of the magnet 174. For example, the sensor 176 may detect changes in the magnetic field of the magnet 174 as the magnet 174 is rotated by the shaft 114. The shaft 114 may be formed of a non-magnetic material so that the shaft 114 does not interfere with the rotational position data collected by the sensor 176. The sensor 176 may be positioned proximate the end 114B of the shaft 114 and/or the magnet 174 to improve the quality of the data collected by the sensor 176, for example, to collect high amplitude variations in the magnetic field without interference from other components of the propulsion unit 100. Mounting the sensor 176 directly to the ESC 106 board avoids the use of wires extending from the sensor 176 that would be subject to signal propagation delay, or signal degradation, loss, or noise.

The ESC 106 preferably processes the data 176 provided by the sensor to determine the rotational position of the shaft 114. The ESC 106 may adjust the power provided to the electric motor 104 based on the rotational position of the shaft 114. As one example, knowing the rotational position of the shaft 114 in real time enables the ESC 106 to more accurately control the power provided to the electric motor 104 which may cause the electric motor 104 to perform more efficiently and/or reduce the noise generated by the motor 104. This may be done by monitoring and synchronizing the rotation of the rotor 104B of the electric motor 104 (e.g., a sensored brushless DC motor). For instance, the ESC 106 may be configured to incrementally adjust the speed of the motor 104 to optimize the drive efficiency and reduce the motor 104 noise output. Monitoring the rotor 104B position further allows for improved vibration and noise characteristics from the motor drive system. For example, by mapping the rotor position using the data provided by the sensor 176, the ESC 106 may be configured to provide electrical signals to the motor 104 to compensate for unwanted noise harmonics of the motor 104 such as cogging torque, torque ripple, mutual inductance, and mutual torque. To compensate for these unwanted noise harmonics, the ESC 106 may use phase advance or vector control and inject phase currents that are the same frequency as the unwanted noise and vibration frequencies, but phase shifted by 180 degrees to cancel out the noise and/or vibrations.

The end 114B of the shaft 114 may include a cavity 178 in which the magnet 174 is positioned. Including the magnet 174 within the cavity 178 of the shaft 114 may reduce the overall length of the motor 104 and may provide protection for the magnet 174 from damage, for example, from inadvertent contact with another object during assembly of the propulsion unit 100. In other embodiments, optical encoding techniques may be used to detect the rotational position of the shaft 114, with an optical sensor of the ESC 106 positioned proximate the end 114B of the shaft 114.

As shown in FIG. 4A, the internal wall 160 further includes hole s 180 through which power wires 182 extend from the ESC 106 to the electric motor 104. A sleeve or a seal may be positioned within the hole s 180 that the wires extend through to form a fluid tight connection between the wires 182 and the internal wall 160 to prevent fluid from passing between the first compartment 162 and the second compartment 164 along the wires 182 or through the hole s 180.

Figure 5A:
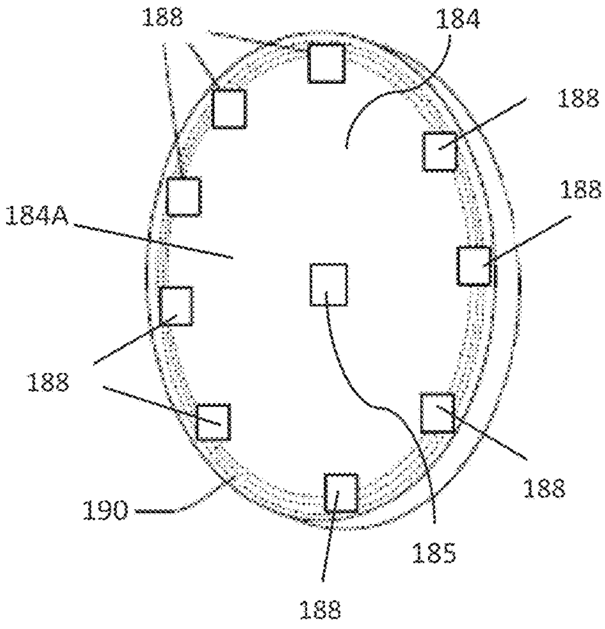
FIG. 5A is a front perspective view of a first circuit board of an electronic speed controller of the propulsion pod of FIG. 1A.
Figure 5B:
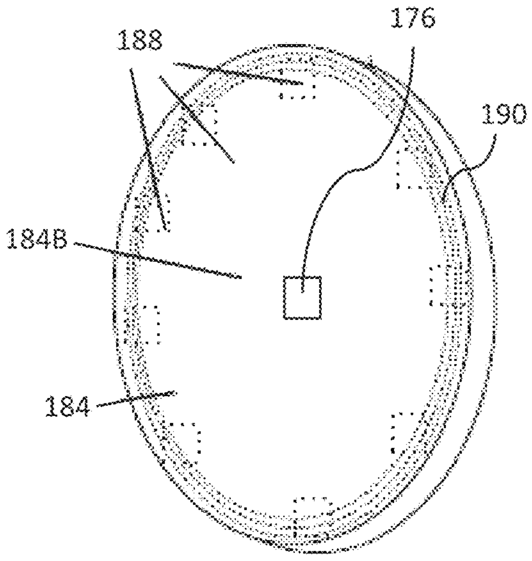
FIG. 5B is a rear perspective view of the first circuit board of the electronic speed controller of FIG. 5A.
Figure 6:
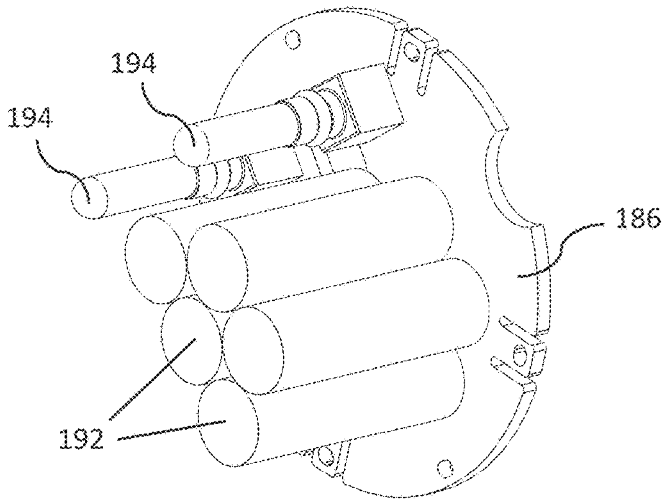
FIG. 6 is a front perspective view of a second circuit board of the electronic speed controller of the propulsion pod of FIG. 1A.

The ESC 106 includes a first circuit board 184 shown in FIGS. 5A-B and a second circuit board 186 shown in FIG. 6. As shown in FIGS. 2-3 the first circuit board 184 and the second circuit board 186 are substantially circular with a diameter sized to fit within the cylindrical outer wall 108. The first circuit board 184 and the second circuit board 186 are stacked and concentric with one another. By stacking or aligning the two circuit boards, the ESC 106 may have a smaller surface area or radial dimension than if a single circuit board is used. Using two circuit boards enables the ESC 106 to have a diameter that is equal to or less than the diameter of the electric motor 104 with which the ESC 106 is aligned. As a result, the housing 102 does not need to be larger than the diameter of the motor 104 to accommodate the ESC 106, thus allowing the housing 102 to have a smaller radial dimension or a smaller surface area in the direction of travel of the watercraft. This reduces the overall drag of the propulsion unit 100 on the watercraft. While the ESC 106 shown includes two circuit boards 184, 186, in other embodiments the ESC 106 may include more circuit boards stacked on one other to achieve the benefits described above. Also, while the circuit boards 184, 186 of the embodiment shown are circular, in other embodiments, the circuit boards 184, 186 may have other shapes including, as examples, rectangular, triangular, or oval. These circuit boards may be stacked so that the cross-section of the housing 102 does not need to be increased beyond the diameter required to house the motor 104.

Another benefit of stacking or aligning the circuit boards 184, 186 is that more of the components of the circuit boards 184, 186 are proximate the outer wall 108, thus permitting the heat generated by the components to be readily dissipated through the outer wall 108 and into the fluid in which the propulsion unit 100 is submerged. As shown, the ESC 106 is sized such that the outer edge of the ESC 106 is contacting or in close contact with the outer wall 108. By placing the ESC 106 in thermal contact with the outer wall 108, the heat generated by the ESC 106 may be conducted to the outer wall 108 and dissipated into the surrounding fluid.

Figure 7:
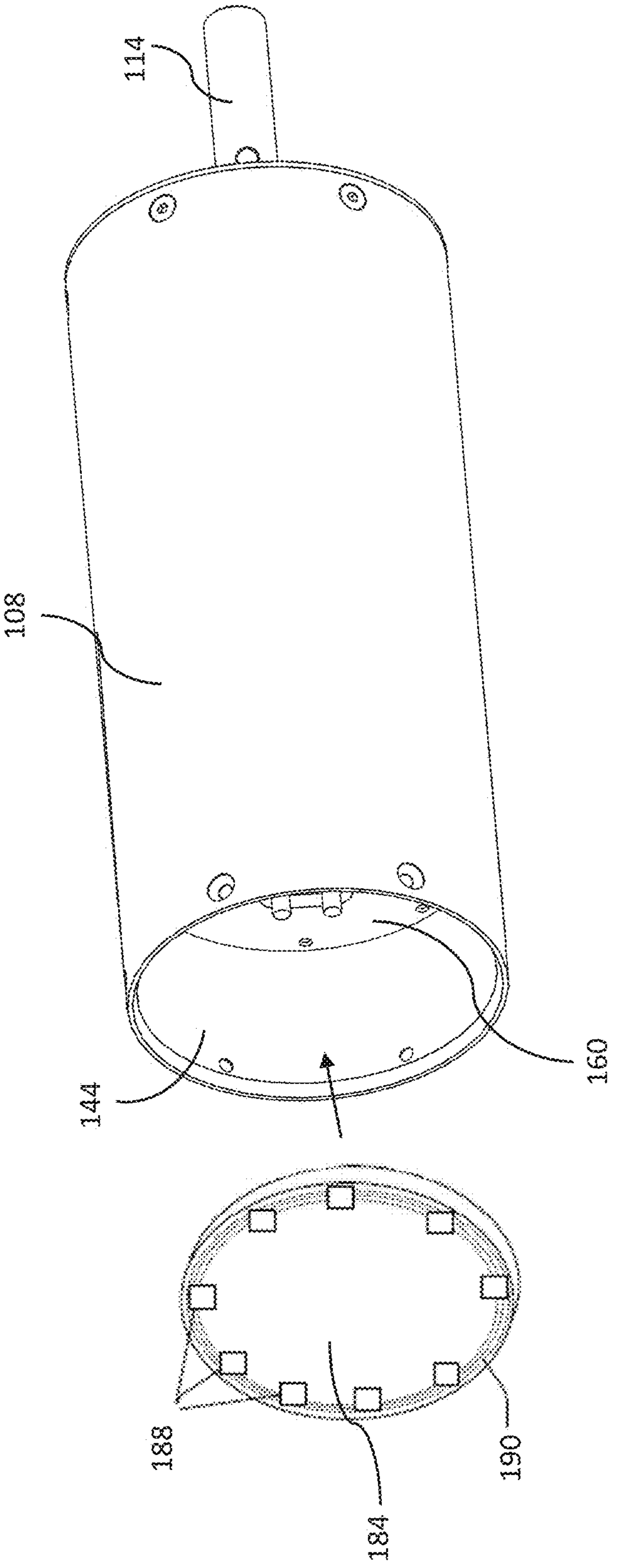
FIG. 7 is a front perspective view of the first circuit board of FIG. 5A mounted within the propulsion pod of FIG. 1A.

With reference to FIGS. 5A-B, the first circuit board 184 or the power transistor board is shown. The power transistor board 184 is positioned within the first compartment 162 of the housing 102 and in thermal contact with the internal wall 160 (see FIG. 7). By positioning the power transistor board 184 to rest against and engage the internal wall 160, the heat generated by the power transistors 188 may be conducted to the internal wall 160. The internal wall 160 may then conduct the heat generated by the power transistors radially outward to the outer wall 108, where the heat may be dissipated into the surrounding fluid.

As shown, the power transistors 188 are mounted about the periphery of the power transistor board 184 in a radial configuration. The power transistors 188 are preferably substantially evenly spaced apart from one another at the outer edge of the board 184. By mounting the power transistors 188 at the radial outer edge of the power transistor board 184, the heat generated by the power transistors 188 is conducted to the fluid via the outer wall 108 and the internal wall 160. Being positioned about the outer edge of the board 184, the distance the heat must be conducted along the internal wall 160 to the outer wall 108 and into the fluid is minimized, which provides for improved heat dissipation.

In the embodiment shown, the power transistors 188 are all mounted to the front side 184A of the power transistor board 184. The power transistor board 184 includes a plurality of vias 190 extending through the power transistor board 184 from the front side to the rear side of the board 184. The vias 190 may be formed of pads formed of a thermally conductive material (e.g., copper) on the front side of the board 184 connected to a thermally conductive pad formed on rear side of the board by an electroplated hole. The vias 190 form thermally conductive pathways from the front side of the board 184 with the power transistors 188 to the rear side of the board 184. The rear side of the board 184B may include a thermally conductive layer or pad 183 (see FIG. 3). The thermally conductive layer or pad 183 may engage or be in thermal communication with the internal wall 160. The thermal layer 183 may conduct the heat from the vias 190 to the internal wall 160. By using vias 190 and the thermally conductive layer 183, a thermally conductive pathway is formed from the power transistors 188 to fluid surrounding the housing 102.

In the embodiment shown, the sensor 176 is mounted to the power transistor board 184. The sensor 176 is mounted to a rear side 184B of the board 184 to detect the rotational position of the shaft 114 of the motor 104. The sensor 176 may be positioned in a central portion of the board 184 proximate the end 114B of the shaft 114 to enable the sensor 176 to collect data from the magnet 174 with minimal interference. The sensor 176 may be connected to a processor of the ESC 106 through an electrical pathway of the board 184. In other embodiments, the sensor 176 may be mounted within the housing 102 to collect the rotational position data of the motor 104 and connected to the ESC 106 through wires.

The power transistor board 184 may further include one or more capacitors 185 to reduce and/or smooth the voltage peaks or spikes that may occur when the power transistors 188 switch on and off to generate pulse-width modulated electrical signals. The switching of power transistors 188 generates voltage peaks or spikes at the transition, due to electrical current acting on the inductance within the system, including for example the power wires. The small filter capacitor 185 preferably reduces these voltage spikes to reduce electrical and acoustic noise in the system.

The ESC 106 further includes the second circuit board 186. The second circuit board 186 may include bulk capacitors 192 that may be used to smooth the pulse-width modulated power signal delivered by the ESC 106, from square waves to a smoother, more consistent voltage level. Including bulk capacitors 192 further allows the intelligent power unit (IPU) 236 to detect a capacitance via the power wires 128 extending to the ESC 106. If no capacitance is detected, the IPU 236 may determine that the ESC 106 is not connected to the IPU 236 and prevent power from being delivered to the power wires. Using the capacitance in the power wires to determine whether the ESC 106 is connected to the IPU 236 is preferred over using the resistance detected through the power wires, since the resistance is prone to fluctuate and change over time, especially in water-based applications. The second circuit board 186 further includes power pins 194 that are mounted to the circuit board 186. The power pins 194 are configured to be placed in electrical contact with the power wires 128 and deliver electrical power to the ESC 106.

The propulsion unit 100 may further include one or more sensors for monitoring the temperature within the housing 100. The sensor(s) may be mounted to a circuit board of the ESC 106 and/or may be mounted to another portion of the housing 102. The temperature sensor may monitor the temperature of the ESC 106 and/or motor 104. This temperature data may be processed by the ESC 106 and/or communicated to the IPU 236 via the communication cable 134 and/or power wires 128. Based on the temperature of the ESC 106 and/or the motor 104, the IPU 236 or the ESC 106 may adjust the performance of motor 104 to allow the ESC 106 or motor 104 to cool. For example, if the temperature of the ESC 106 exceeds a threshold temperature, the motor 104 may be limited to operate below a certain power level (e.g., 50% of the motor 104 maximum power output). Once the temperature returns below a threshold level, the performance of the motor 104 may return to is normal operating parameters.

Figure 8A:
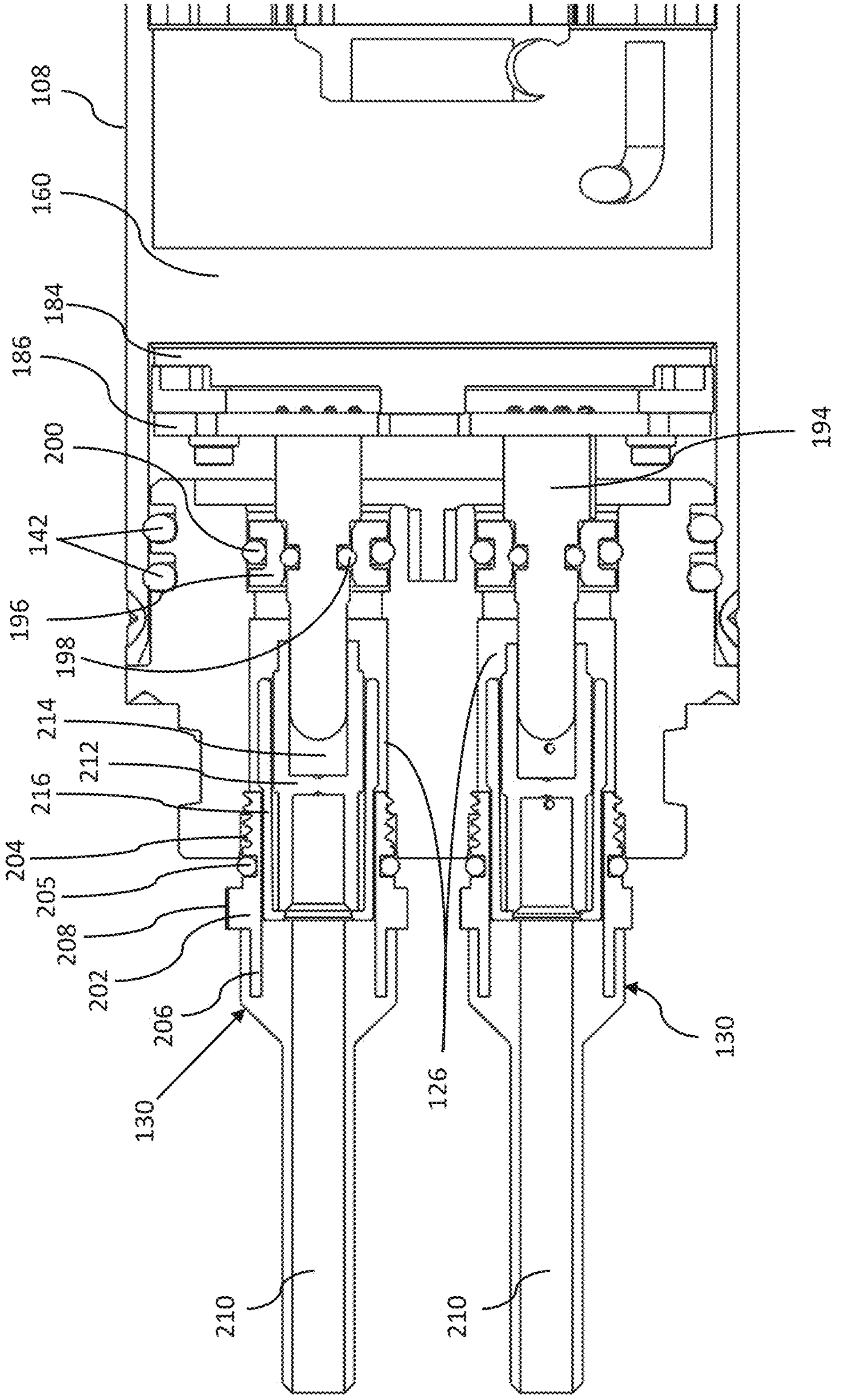
FIG. 8A is a cross-sectional view of a front portion of the propulsion pod of FIG. 1A taken along lines 8A-8A of FIG. 1B.

With respect to FIG. 8A, conductive power pins 194 are mounted to the second circuit board 186. Each power pin 194 includes an insulator ring 196 surrounding the power pin 194. The power pin 194 may be formed of a conductive metal such as brass, silver, or an alloy. A seal 198 (e.g., an O-ring) may be positioned between the power pin 194 and the insulator ring 196 to form a fluid tight connection therebetween. A seal 200 (e.g., an O-ring) may also be positioned about the outer edge of the insulator ring 196. The insulator ring 196 may include a groove for receiving and retaining the seal 200. When the front end cap 110 is attached to the outer wall 108, the hole s 126 are aligned with the power pins 194 such that the power pins 194 extend into the hole s 126. The seal 200 of each power pin 194 engages the inner surface of the hole s 126 to form a fluid tight connection. This prevents fluid and debris from entering the housing even when the power wires 128 are detached or disconnected from the propulsion unit 100. This enables the propulsion unit 100 to be disconnected from a watercraft in the water, in the sand, or other harsh environments. For instance, the propulsion unit 100 shown in FIG. 1A with the power wires 128 removed is watertight such that fluid and debris entering the hole s 126 is prevented from entering the housing 102.

The ends of each power wire 128 may be connected to connector 130. Connector 130 includes a cylindrical body 202 having a first end 204 and a second end 206 separated by a ridge 208. The first end 204 includes threads that are configured to engage corresponding threads of the hole 126 of the front end cap 110. The first end 204 may be threaded into the hole 126 to secure the connector 130 to the front end cap 110. A seal 205 (e.g., an O-ring) is positioned within a groove about the exterior surface of the first end 204. When the first end 204 is threaded into the hole 126, the seal 205 is brought into engagement with the interior surface of the hole 126 to form a fluid tight seal preventing fluid from entering the hole 126. In other embodiments, the seal 205 may be positioned to engage the surface about the hole 126 of the front end cap 110. A boot seal 210 is attached to the second end 206 of the connector 130. The boot seal 210 may be formed of a flexible material, such as a rubber, and extends over a portion of the length of the power wire 128. The boot seal 210 provides a fluid barrier between the insulation of the power wire 128 and the cylindrical body 202 to prevent fluid from contacting the power wire 128, thus keeping the wire 128 insulated.

The power wires 128 extend into the cylindrical body 202 of the connector 130 to a conductive pin connector 212. The pin connector 212 may be formed of a conductive metal such as brass, silver, or an alloy. The power wire 128 may be soldered to the conductive pin connector 212 or otherwise secured to the conductive pin connector 212 such that the power wire 128 is electrically connected thereto. The conductive pin connector 212 includes a pin socket 214 for receiving the conductive power pin 194 of the ESC 106. Thus as the connector 130 is secured to the front end cap 110, for example, by threading the connector 130 to the front end cap 110, the power pin 194 is inserted into the pin socket 214 of the pin connector 212. Thus the power wire 128 is electrically connected to the power pin 194 via the connector 130. The connector 130 may further include a boot seal 216 positioned between the cylindrical body 202 and the pin connector 212 to form a fluid tight seal therebetween. This prevents fluid and debris from contacting the wires 128 when the connector 130 is disconnected from the front end cap 110, for example, when the propulsion unit 100 is removed from a watercraft in the water or in the sand.

Figure 8B:
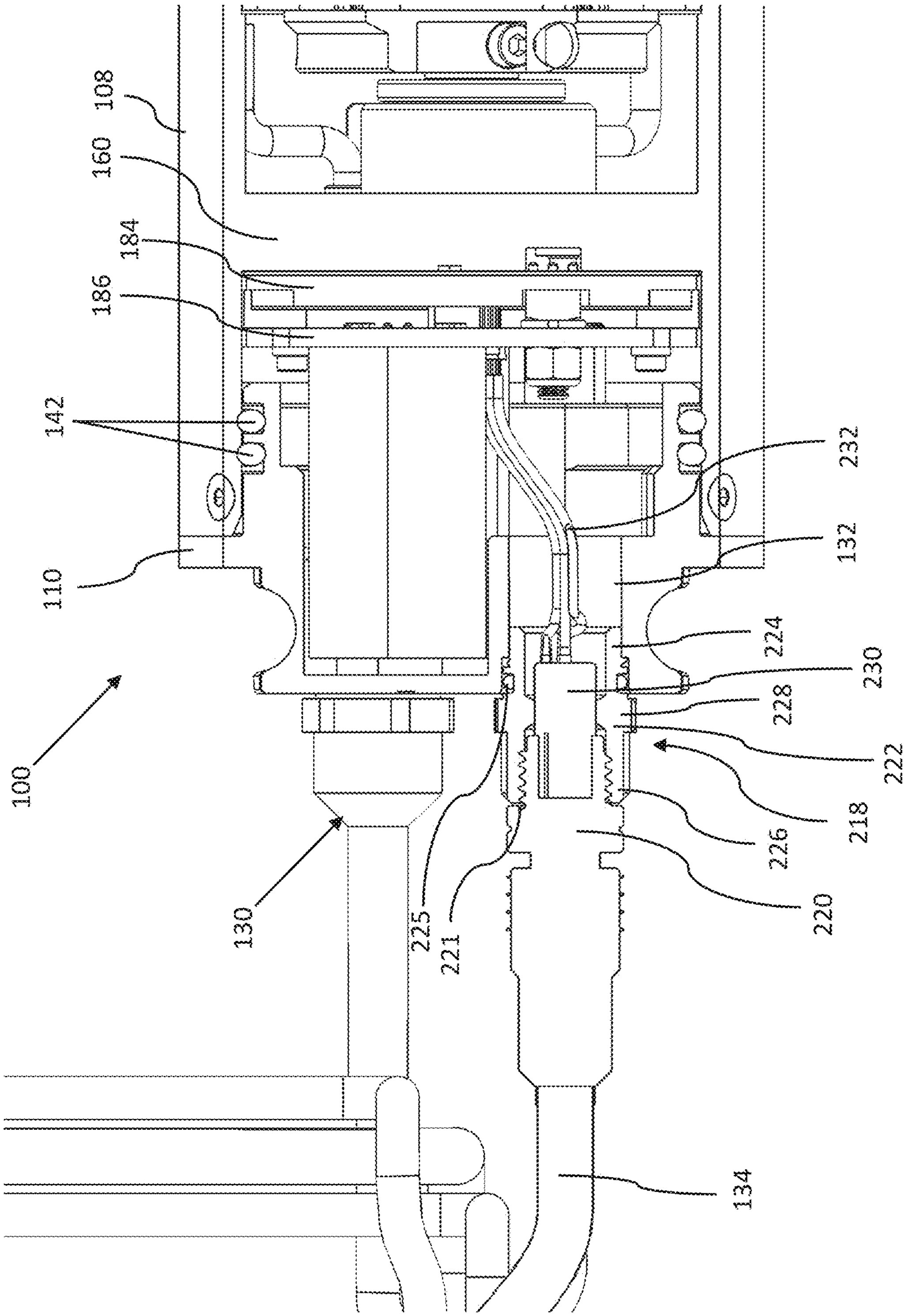
FIG. 8B is a cross-section view of a front portion of the propulsion pod of FIG. 1A taken along lines 8B-8B of FIG. 1B

With respect to FIG. 8B, a communication cable 128 may be attached to the propulsion unit 100 to enable the propulsion unit 100 to communicate data with other devices of the watercraft, e.g., the IPU 236. For example, the IPU 236 may communicate motor control information to the ESC 106. In another example, the propulsion unit 100 may communicate data regarding various conditions of the propulsion unit 100 and/or the watercraft including, as example, the temperature of the ESC 106 and/or the motor 104, the pressure within the propulsion unit 100, characteristics of the motor 104 or ESC 106 performance, or a depth of the propulsion unit 100 relative to the surface of the water (as discussed in further detail below). A connector receptacle 218 is attached to the front end cap 110 that may be removably connected with a connector plug 220 secured to the end of the communication cable 128. The connector receptacle 218 includes a cylindrical body 222 having a first end 224 and a second end 226 separated by a ridge 228. The first end 224 includes threads that are configured to engage corresponding threads of the hole 132 of the front end cap 110. The first end 224 may be threaded into the hole 132 to secure the connector receptacle 218 to the front end ca p 110. A seal 225 (e.g., an O-ring) is positioned within a groove about the exterior surface of the first end 224. When the first end 224 is threaded into the hole 132, the seal 225 is brought into engagement with the interior surface of the hole 132 to form a fluid tight seal preventing fluid and debris from entering the hole 132. In other embodiments, the seal 225 may be positioned to engage the surface of the front end cap 110 about the hole 132. This seal 225 prevents fluid from entering the housing 102, enabling the communication cable 134 to be removed even when, for example, the propulsion unit 100 is in the water. For example, the propulsion unit 100 shown in FIG. 1A with the communication cable 134 removed is watertight such that fluid and debris entering is not able to enter the housing 102.

The second end 226 of the connector receptacle 218 includes threads on the internal surface thereof for engagement with threads on an outer surface of the end of the connector plug 220. The connector plug 220 includes a seal 221 that engages the connector receptacle 218 when attached to form a fluid tight connection therebetween. The connector receptacle 218 further includes a pin receiver 230 within the cylindrical body 222 that includes a plurality of conductive sockets for receiving pins of the connector plug 220. The connector plug 220 may include one or more conductive pins that may be inserted into the sockets of the pin receiver 230 to place the pins in electrical communication with the conductive sockets. Wires 232 extend from the conductive sockets to the ESC 206. Thus, when the connector plug 220 is inserted and secured to the connector receptacle 218, signals may be communicated to and from the ESC 206 through the communication cable 128 via the connector receptacle 218 and the connector plug 220.

Figure 9A:
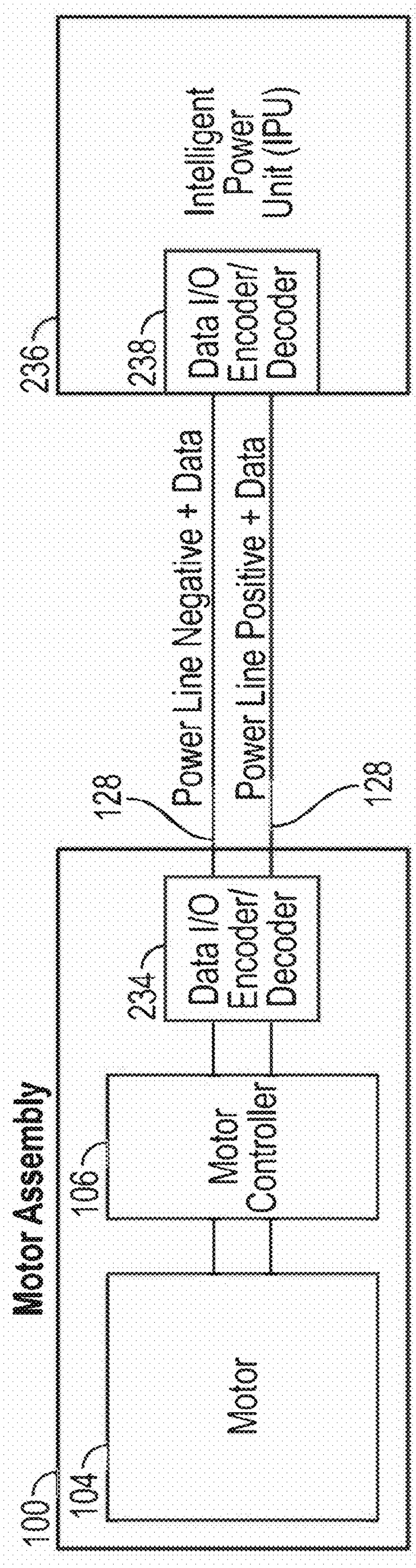
FIG. 9A is a block diagram showing the communication between an intelligent power unit and the propulsion pod of FIG. 1A according to one embodiment.

In alternative embodiments, the propulsion unit 100 does not include a hole 132 in the front end cap 110 and data is communicated over the power wires 128. With reference to FIG. 9A, the propulsion unit 100 includes the motor 104, the ESC 106, and a data encoder/decoder 234. The propulsion unit 100 may communicate with other components of the watercraft via the power wires 128. As shown, the propulsion unit 100 may communicate with a IPU 236. The IPU 236 may determine how much power to provide to the ESC 106 and provide data indicating to the ESC 106 how to control or operate the motor 104. The IPU 236 may also include a data encoder/decoder 238. To communicate data to the propulsion unit 100, the IPU 236 passes the message or data through the data encoder/decoder 238 to encode the data and superimpose the data signal on positive and negative power wires 128. The data encoder/decoder 234 of the propulsion unit 100 receives the encoded data from the IPU 236 and decodes the data. The data is then provided to the ESC 106. The ESC 106 may then, for example, adjust the control of the motor 104. The ESC 106 may similarly communicate data to the IPU 236 over the positive and negative power wires 128 via the data encoder/decoder 234.

Figure 9B:
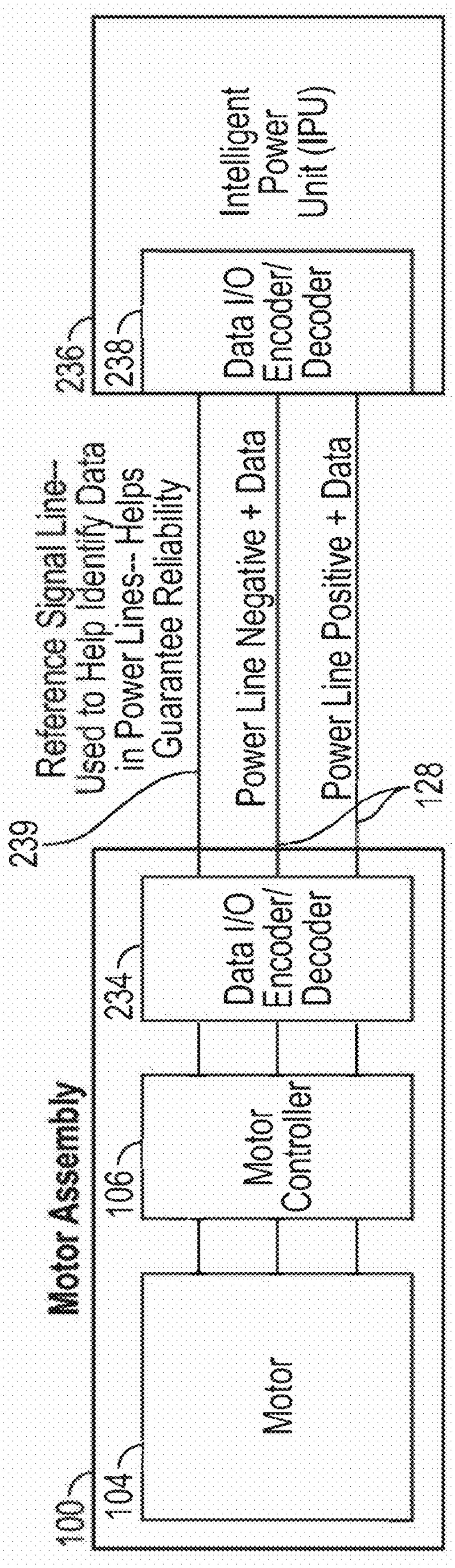
FIG. 9B is a block diagram showing the communication between the intelligent power unit and the propulsion pod of FIG. 1A according to a second embodiment.

With respect to FIG. 9B, in another embodiment, in addition to the power wires 128, a reference signal line 239 also extends between the data encoder/decoder 234 of the propulsion unit 100 and the data encoder/decoder 238 of the IPU 236. The reference signal line 239 provides a reference signal against which the data signals in the power wires 128 may be compared to aid in identifying and decoding data in the power wires 128. Inclusion of the reference signal wire 239 may aid to improve the reliability of the transmission and receipt of data sent via the power wires 128.

The propulsion unit 100 may be used with a watercraft to propel the watercraft through the water. The propulsion unit 100 may be attached to the watercraft such that the propulsion unit 100 is submerged within the water so that a propeller coupled to the shaft 114 of the motor 104 propels the watercraft. As one example, with respect to FIG. 10A-D, a hydrofoiling watercraft 300 is shown including the propulsion unit 100. The hydrofoiling watercraft 300 includes a hydrofoil 302 having a strut 304 and hydrofoil wings 306. As shown, the propulsion unit 100 is attached to the strut 304 such that the propulsion unit 100 is adjacent the trailing edge of the strut 304. The hydrofoiling watercraft 300 includes a board or flotation portion 305 that supports a user or a rider. For example, a user may stand, sit, or lay on the board 305 and operate the watercraft 300 via a handheld controller communicatively coupled to a computing device of the watercraft 300. In the embodiment shown, a computing device such as the IMU 236 and a battery are contained within the battery box 308 that forms a portion of the deck 310 of the watercraft 300. The battery box 308 may include a connector that electrically couples with connector 312 on the top of the strut 304 to place the battery box 308 in electrical communication with the power wires 128 (and in some embodiments, the communication cable 134). The power wires 128 and communication cable 134 may extend within the strut from the connector 312 to the propulsion unit 100. Thus, the IMU 236 and the propulsion unit 100 are in electrical communication. Power may be provided via the power wires 128 and the IMU 236 and propulsion unit 100 may communicate via the power wires 128 and/or the communication cable 134.

Figure 10A:
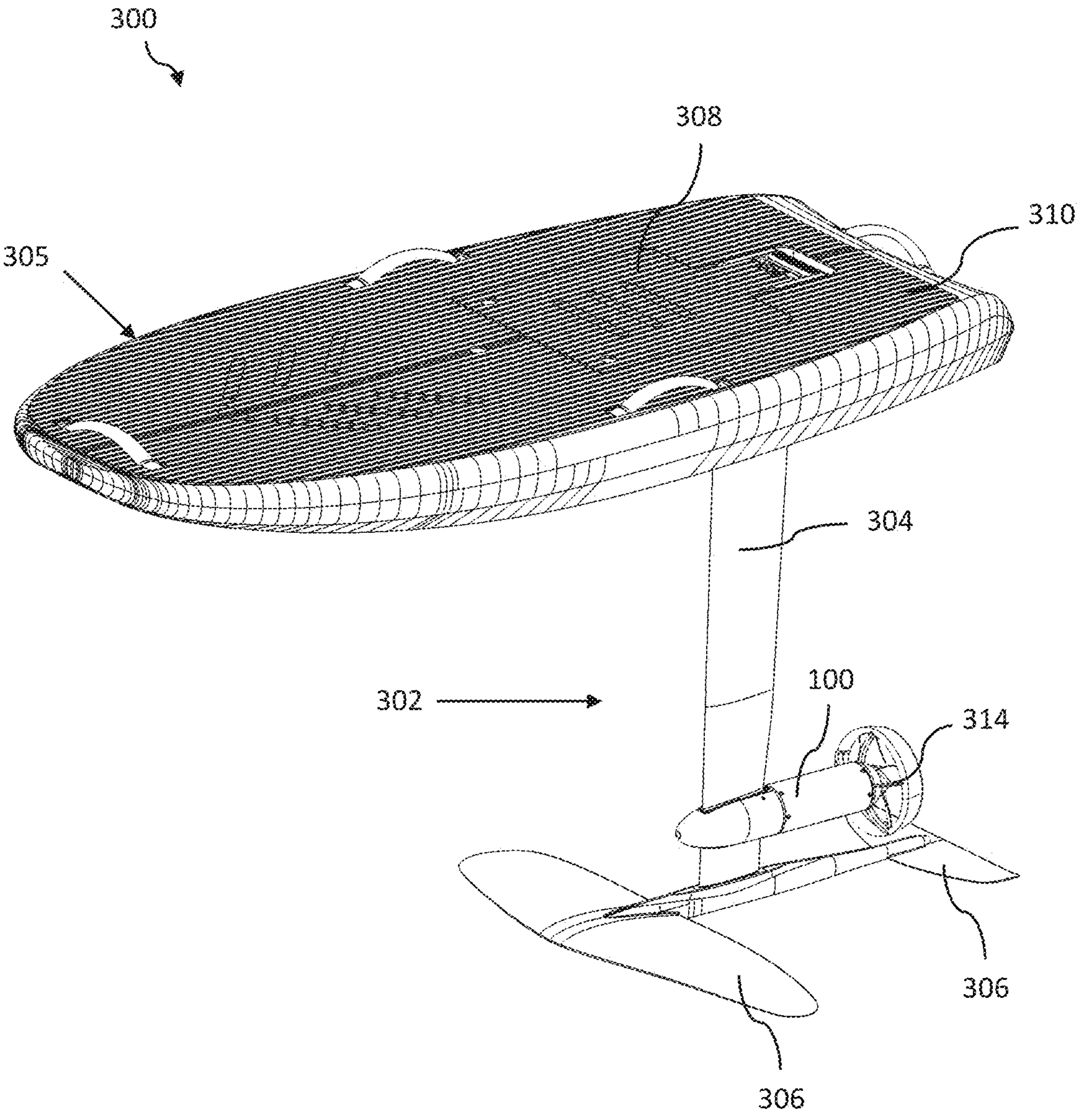
FIG. 10A is a front perspective view of a hydrofoiling watercraft including the propulsion pod of FIG. 1A.
Figure 10C:
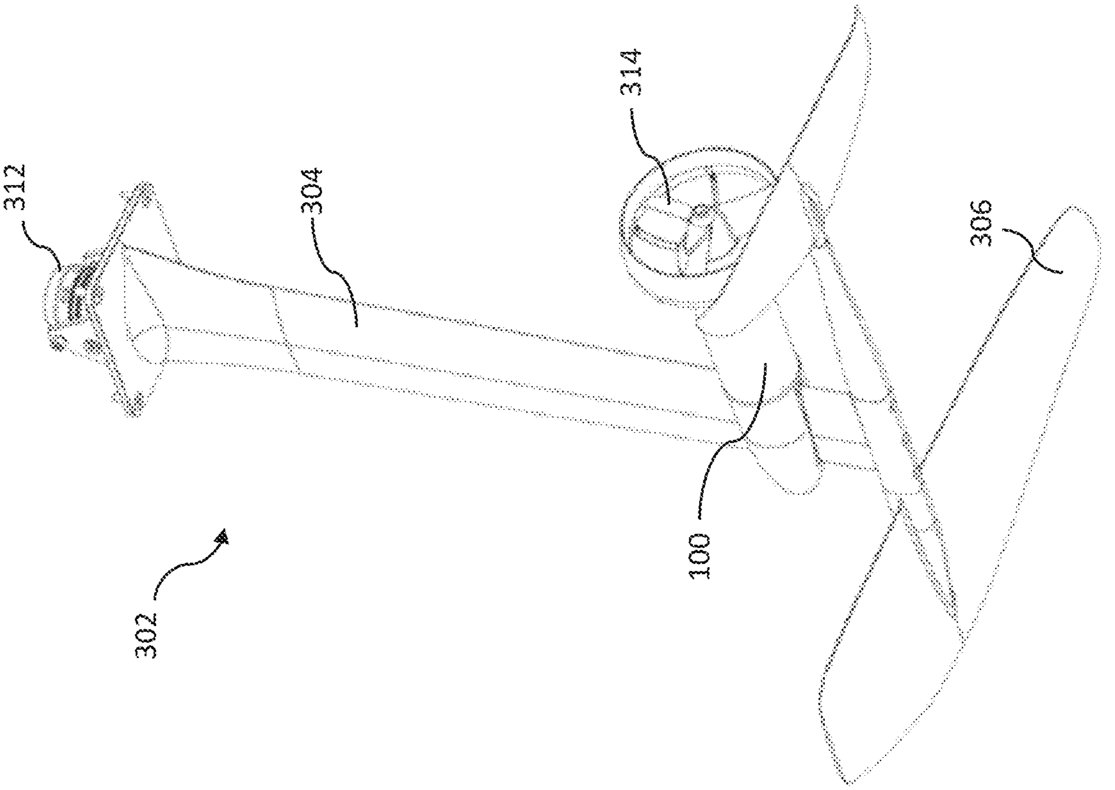
FIG. 10C is a rear perspective view of the hydrofoil of the watercraft of FIG. 10A including the propulsion pod of FIG. 1A.
Figure 10B:
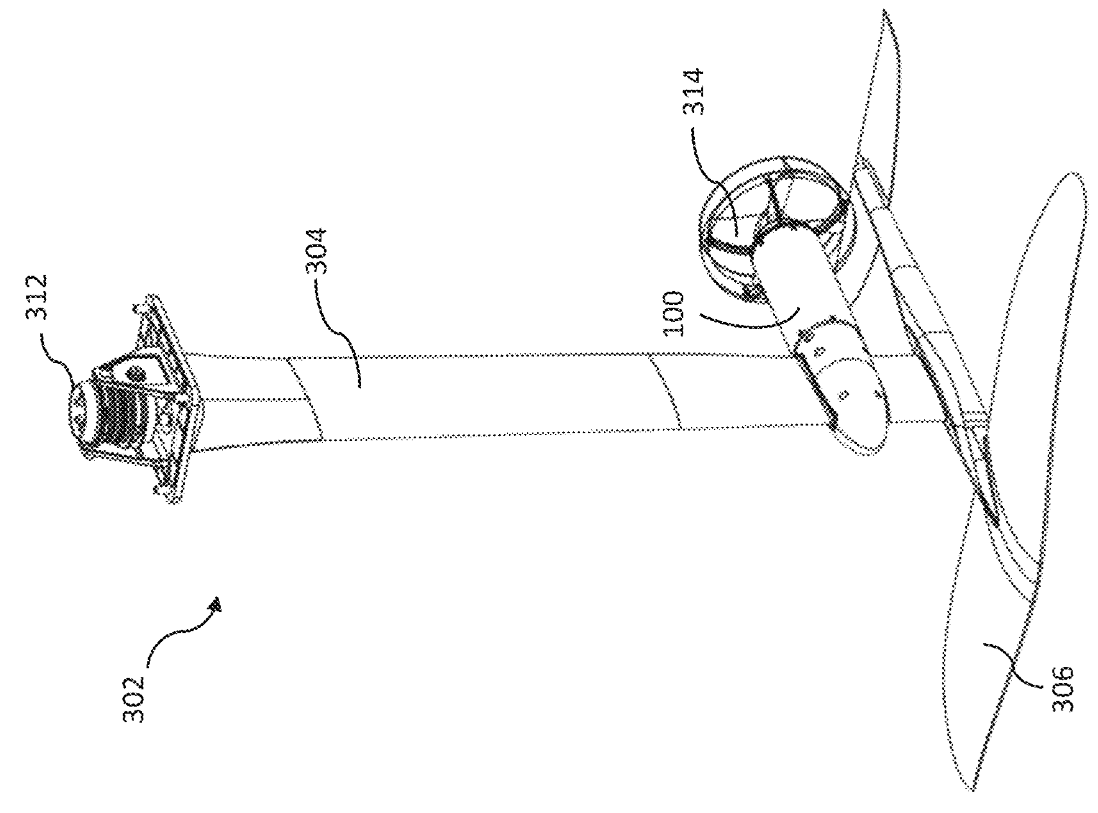
FIG. 10B is a front perspective view of a hydrofoil of the watercraft of FIG. 10A including the propulsion pod of FIG. 1A.
Figure 10D:
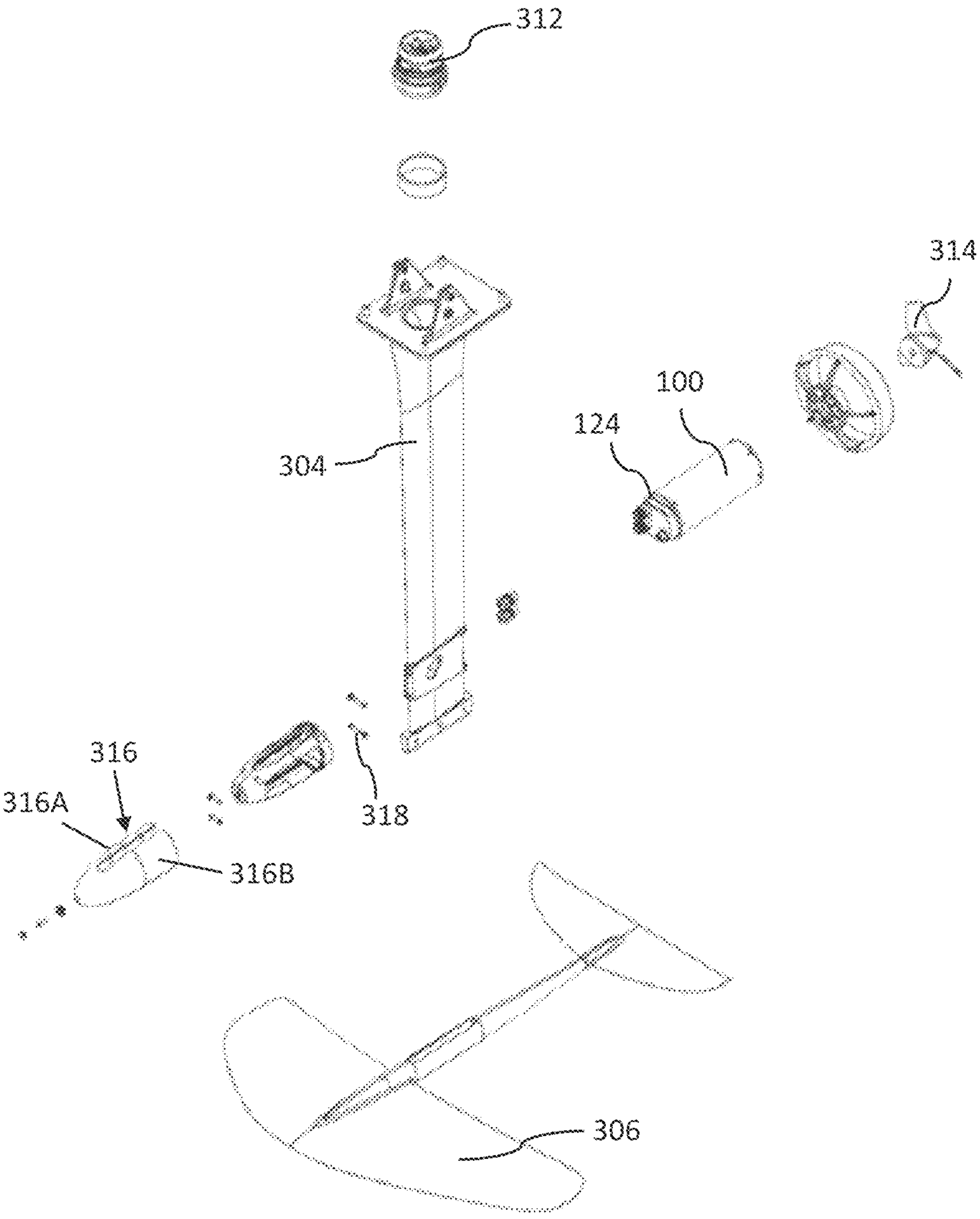
FIG. 10D is an exploded view of the hydrofoil of the watercraft of FIG. 10A including the propulsion pod of FIG. 1A.
Figure 10E:
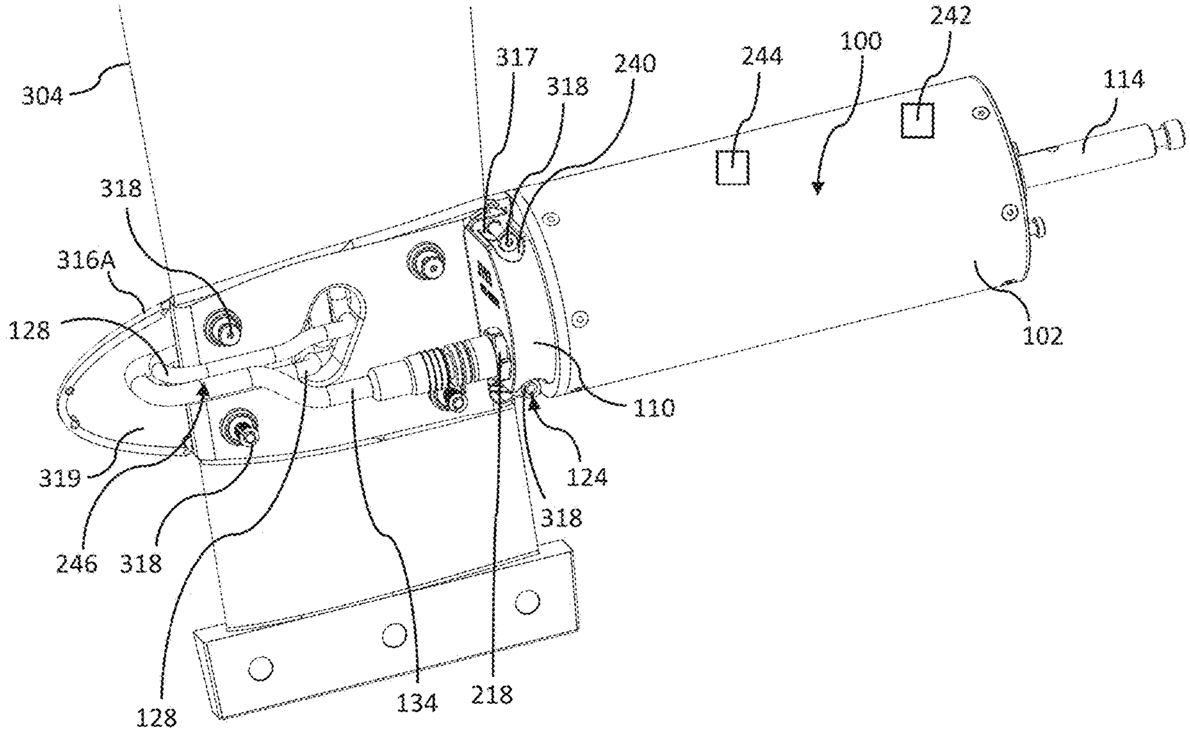
FIG. 10E is a side perspective view of the propulsion pod of FIG. 1A attached to a strut of the watercraft of FIG. 10A, shown with a portion of the attachment bracket removed.

As shown in FIG. 1B and FIG. 10E, the power wires 128 and the communication cable 134 are shown to extend longitudinally away from the front end cap 110, form a loop 246 about a central axis, before extending parallel to the central axis. When the propulsion unit 100 is used with the hydrofoiling watercraft 300, the power wires 128 and communication cable 134 may be wound about a portion of the strut 304 to form the loop 246. The power wires and communication cable 134 may then extend to the propulsion unit 100 and along the strut 304 from the loop 246. By forming the loop 246 about the portion of the strut 304, the power wires 128 and the communication cable 134 are anchored to lower end of the strut 304. Thus, for example when the power wires 128 or communication cable 134 are pulled to be connected to the propulsion unit 100, the force applied by the power wires 128 and communication cable 134 to the connector 312 at the top end of the strut 304 is reduced. Similarly, pulling the power wires 128 or the communication cable 134 to be connected to the connector 312 reduces the forces applied to the connector 130 and/or connector receptacle 218 when the power wires 128 and communication cable 134 are already connected to the propulsion unit 100. This aids to prevent damage to the wires and connectors.

The propulsion unit 100 is attached to the strut 304 via the attachment interface 124. The attachment interface 124 includes grooves 240 (see FIGS. 1B and 10E) that receive a protrusion 317 of a mounting bracket 316 that is affixed to the strut 304. In the embodiment shown in FIG. 10A-E, the mounting bracket 316 includes two halves 316A, 316B that are joined together by fasteners 318. One half 316A of the mounting bracket 316 is placed on the right side of the strut and the other half 316B is placed on the left side of the strut 304. The mounting backet 316 includes a slot through which the strut 304 extends through the mounting bracket 316. The rear end of each half 316A, 316B of the mounting bracket 306 includes protrusions 317 on the upper and lower portions that are slid into the grooves 240 of the attachment interface 124 of the propulsion unit 100. Each half of the mounting bracket 316 may be slid onto the attachment interface 124 until the outer wall 319 of the mounting bracket 316 is brought into contact with the front end cap 110. Once the mounting bracket 316 is positioned about the strut 304 and the protrusions 317 are within the grooves 240, fasteners (such as bolts) 318 may be used to fasten each half of the mounting bracket 316 to the strut 304 and to one another. With the protrusions 317 of the mounting bracket 316 in the grooves 240 and the mounting bracket halves 316A, 316B fastened together, the propulsion unit 100 is secured to the strut 304.

A propeller 314 is coupled to the end 114A of the shaft 114 of the motor 104. The IPU 236 may thus provide power and control signals to the propulsion unit 100 to cause the propeller 314 to turn to propel the watercraft 300 through the water. In other embodiments, the end 114A of the shaft 114 of the motor 104 may be coupled to an impeller of a waterjet to propel the watercraft 300 through the water.

Figure 15:
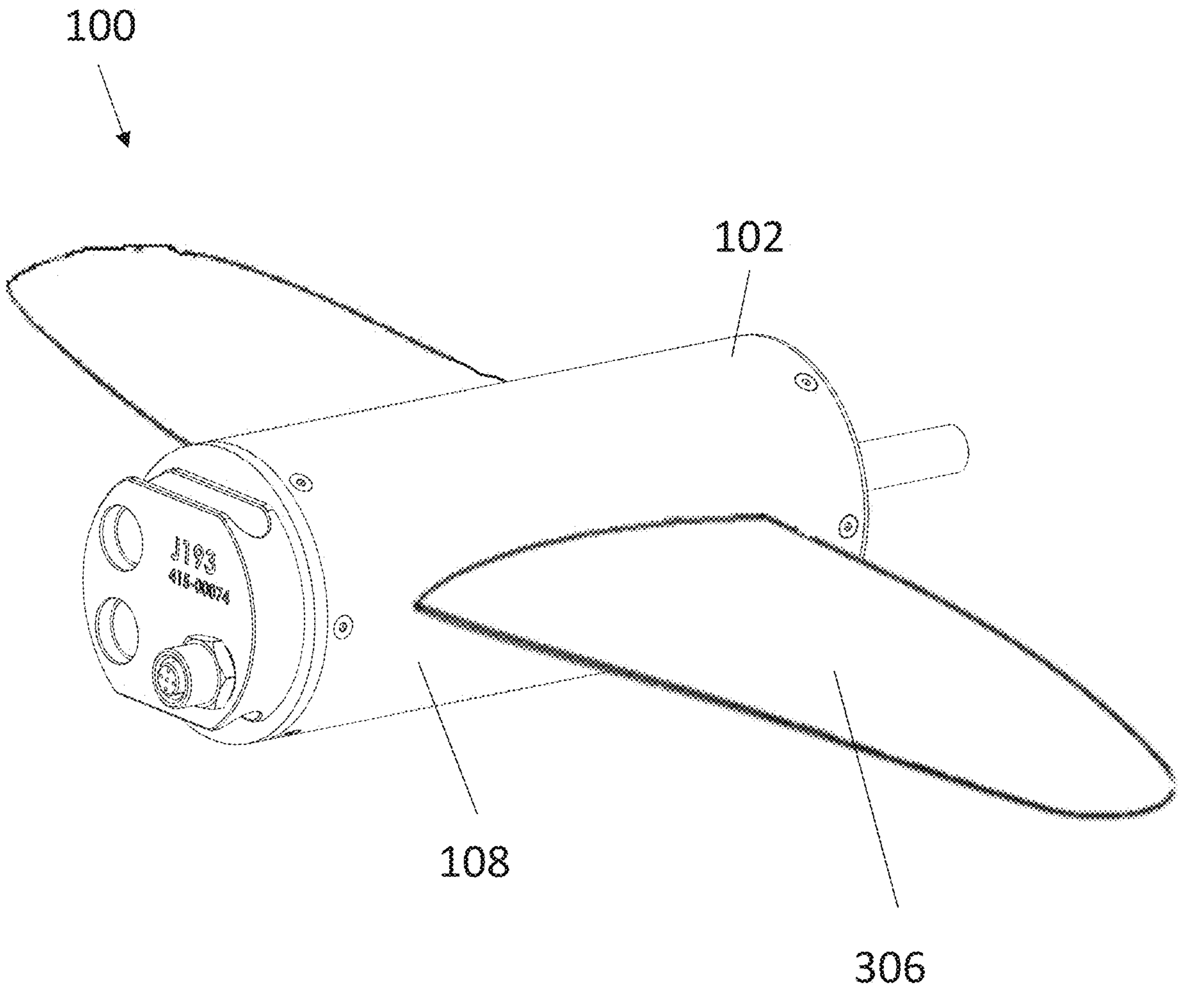
FIG. 15 is a perspective view of a propulsion pod according to another embodiment having hydrofoil wings.
Figure 16:
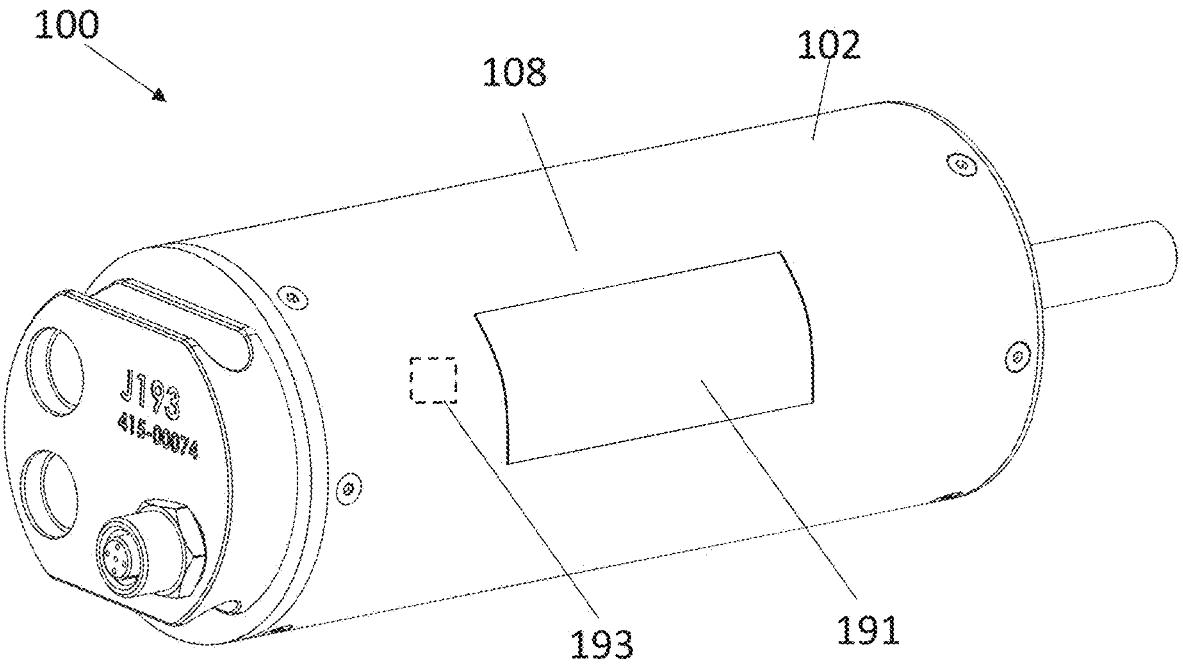
FIG. 16 is a perspective view of a propulsion pod according to another embodiment having movable control surfaces.

In some embodiments, the propulsion unit 100 forms a fuselage from which hydrofoil wings, such as hydrofoil wings 306, extend as shown in FIG. 15. The propulsion unit 100 or the hydrofoil wings 306 extending from the propulsion unit 100 may include movable control surfaces on the outer surface thereof. For instance, the movable control surfaces may be pivoted outward or inward to adjust the flow of fluid over the hydrofoil wing or the propulsion unit 100 to adjust the lift provided by the hydrofoil, increase the drag, and/or turn the watercraft 300 as examples. In one embodiment, shown in 16, the outer wall 108 of the housing 102 of the propulsion unit 100 includes a movable control surface 191. The propulsion unit 100 may include an actuator 193, such as a motor, linear actuator, or dynamic wing servo, that is coupled to the movable control surface 191 and configured to move the control surfaces between various positions. The propulsion unit 100 may further house a computing device configured to control the position of the movable control surface. The computing device may receive a control signal from a computing device of the watercraft 300 via the power wires 128 or communication cable 134 to adjust to the position of the control surfaces. The computing device may be coupled to the actuator 193 and cause the actuator to adjust the position of one or more movable control surfaces. The position of the movable control surfaces may be adjusted to maintain a ride height of the board 305 of the watercraft above the surface of the water.

The propulsion unit 100 may include one or more sensors for monitoring the conditions of the propulsion unit 100 and or the watercraft to which the propulsion unit 100 is mounted (e.g., hydrofoiling watercraft 300). As one example, the propulsion unit 100 may include a sensor 242 for monitoring the distance between the propulsion unit 100 and the surface of the water in which the propulsion pod is operating. This sensor 242 may be an ultrasonic sensor and a radar sensor as examples. The sensor 242 may be mounted to the housing 102 and positioned to face upward toward the surface of the water. As one example, the sensor 242 may be mounted on a top portion of the outer wall 108 and directed upward, for example, parallel to the strut 304. The propulsion unit 100 may use or may communicate this distance data to a computing device of the watercraft for a determination of the height of a portion of the watercraft above the surface of the water. As an example, where the propulsion unit 100 is used with the hydrofoiling watercraft 300, the distance between the board 305 and the surface of the water may be calculated, using the known distance between the sensor 242 and the board 305. Mounting an upward facing sensor 242 to a portion of the watercraft underneath the water to measure the distance to the surface of the water from underneath the surface is advantageous, since the sensor 242 is not as affected by the waves and splashing of water as are sensors mounted to the board 305 or other portion of the watercraft above the water and configured to measure the distance to the water from above the surface of the water.

The propulsion unit 100 may also include a pressure sensor 244 configured to monitor the pressure of the water surrounding the propulsion unit 100. Based on the detected pressure, the depth of the propulsion unit 100 may be determined and the ride height of the board 305 may be calculated.

Figure 11A:
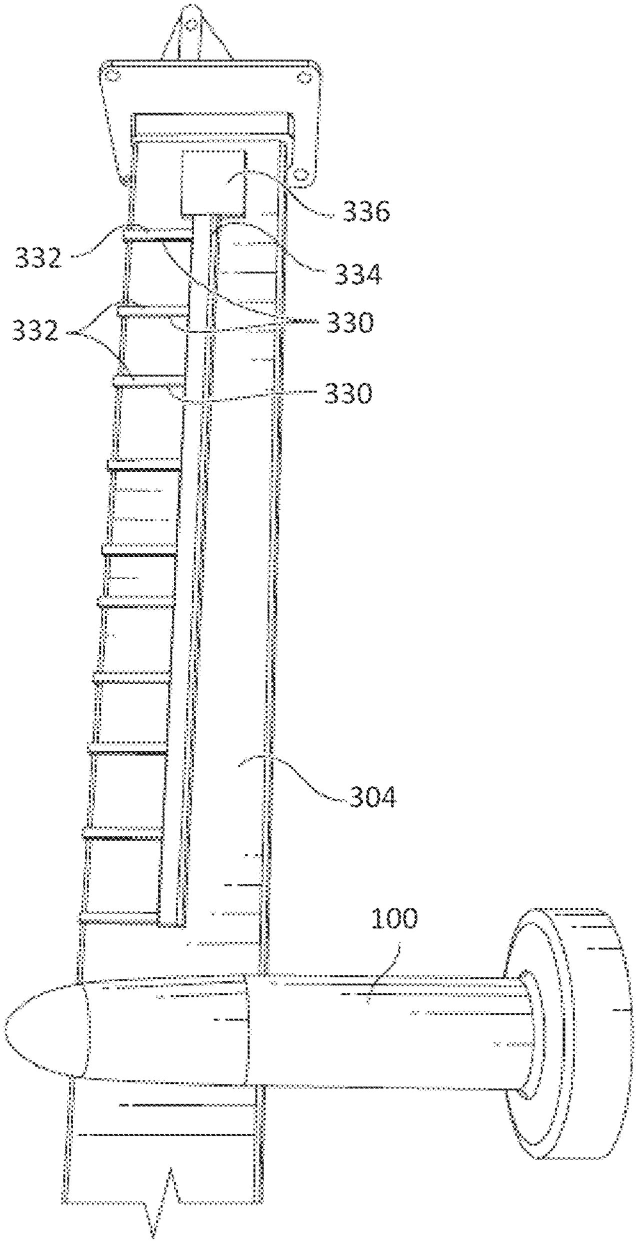
FIG. 11A is a side view of a strut of the watercraft of FIG. 10A including pressure tubes for monitoring the ride height of the watercraft.

In an alternative embodiment, with reference to FIG. 11A, the ride height of a portion of the watercraft above the water (e.g., the board 305) may be determined via a plurality of pressure tubes 330 disposed along the height of the strut 304. One end 332 of the pressure tube 330 may extend to the outer surface of the strut 304 and the other end 334 may be coupled to a sensor 336 that monitors the pressure within the pressure tubes 330. When a pressure tube 330 transitions from being above the surface of the water or below the surface of the water, the pressure change within the tube is detected and monitored. By knowing which sensors 336 are monitoring which pressure tubes 330, and where the ends 332 of the pressure tubes 330 terminate along the height of the strut 304, the height of the board 305 above the water may be estimated. Additionally, the ends 332 of the pressure tubes 330 that are underwater may have different pressure readings that correspond with the depth of each pressure tube 330 within the water. Based on these pressure readings, the ride height of the watercraft 100 may be calculated. In some forms, the sensor 336 may be housed within the propulsion unit 100. In other forms, the sensor is mounted to the strut 304.

Figure 11B:
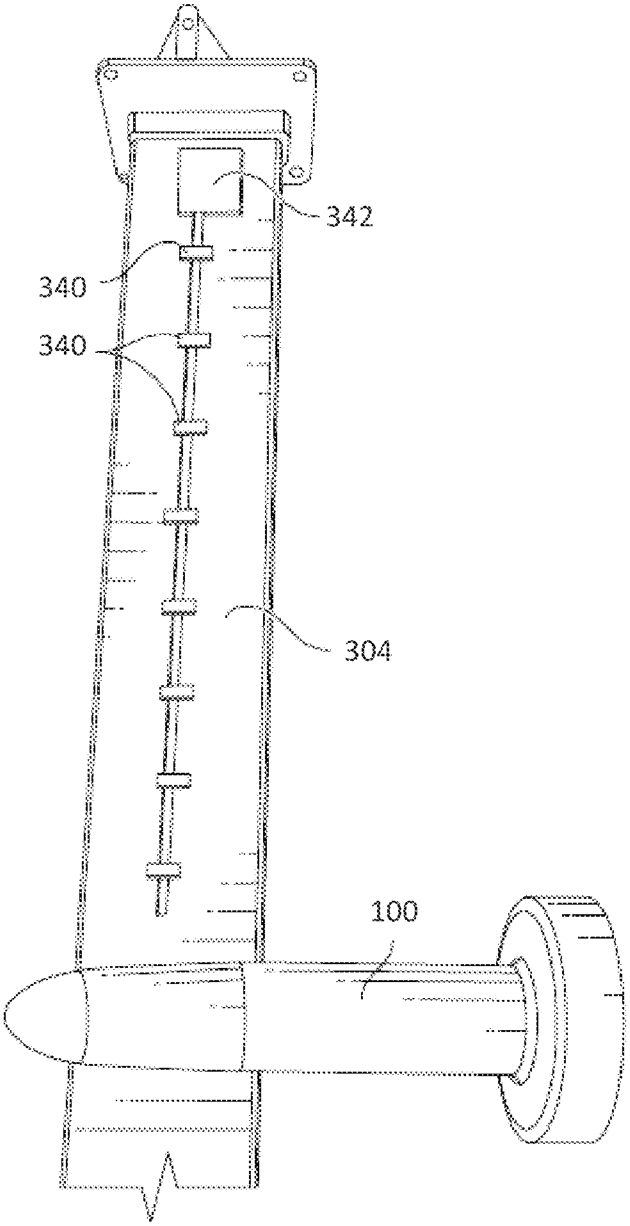
FIG. 11B is a side view of the strut of the watercraft of FIG. 10A including antennas for monitoring the ride height of the watercraft.

In another embodiment, with reference to FIG. 11B, the ride height of a portion of the watercraft above the water (e.g., the board 305) may be determined via a plurality of receivers 340 disposed along the height of the strut 304 in a linear array. A transmitter 342 above the surface of the water may output a signal to be detected by each of the receivers 340 and communicated to a controller. As the ride height of the watercraft fluctuates, some of the receivers 340 will be underwater and some may be above the surface of the water. The receivers 340 underneath the water will not detect the radio frequency signal of the transmitter 342. Thus, knowing the location of the receivers 340 along the strut 304, and knowing which receivers 340 are underwater are not receiving the signal, the ride height of the watercraft may be determined. The radio frequency output by the transmitter 342 may be for example, in the range of 1 kHz to 10 GHz. A higher frequency signal may be used to decrease the propagation of the signal through the water, such that receivers 340 do not receive the signal when under the surface of the water. In other embodiments, a linear array of a plurality of transmitters 342 may be transmitting a radio frequency signal to be detected by a receiver 340 mounted at the top end of the strut or within the board. Based on the signals the receiver 340 detects from the transmitters 342, the ride height of the watercraft 300 may similarly be determined.

The ride height of the watercraft 300 may be maintained by adjusting the speed of the motor 304 and/or by adjusting the position of the movable control surface of the propulsion unit 100 or the hydrofoil wings 306. A computing device of the watercraft 300 may receive the ride height data from one or more sensors of the watercraft 300 and adjust the speed of the motor 304 and/or the movable control surface to maintain the ride height at a certain distance or within a certain range.

Figure 12:
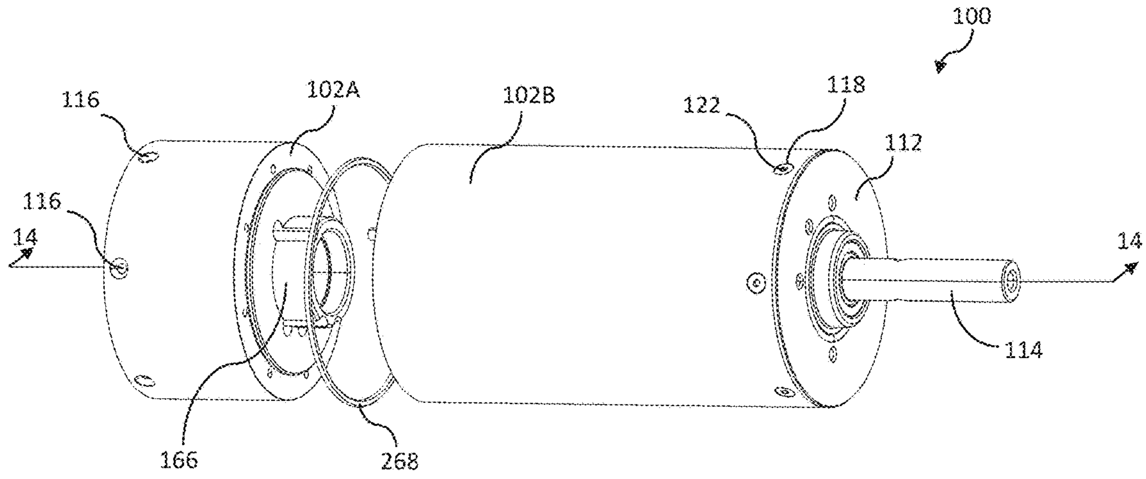
FIG. 12 is a partially exploded rear perspective view of a propulsion pod according to another embodiment of this disclosure.
Figure 13:
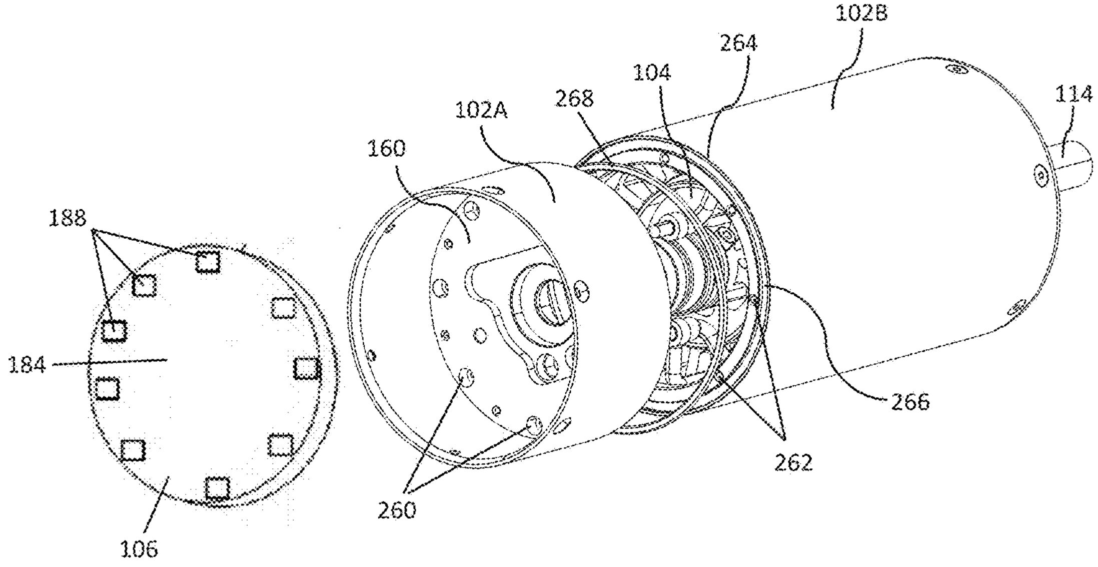
FIG. 13 is a partially exploded front perspective view of the propulsion pod of FIG. 12.
Figure 14:
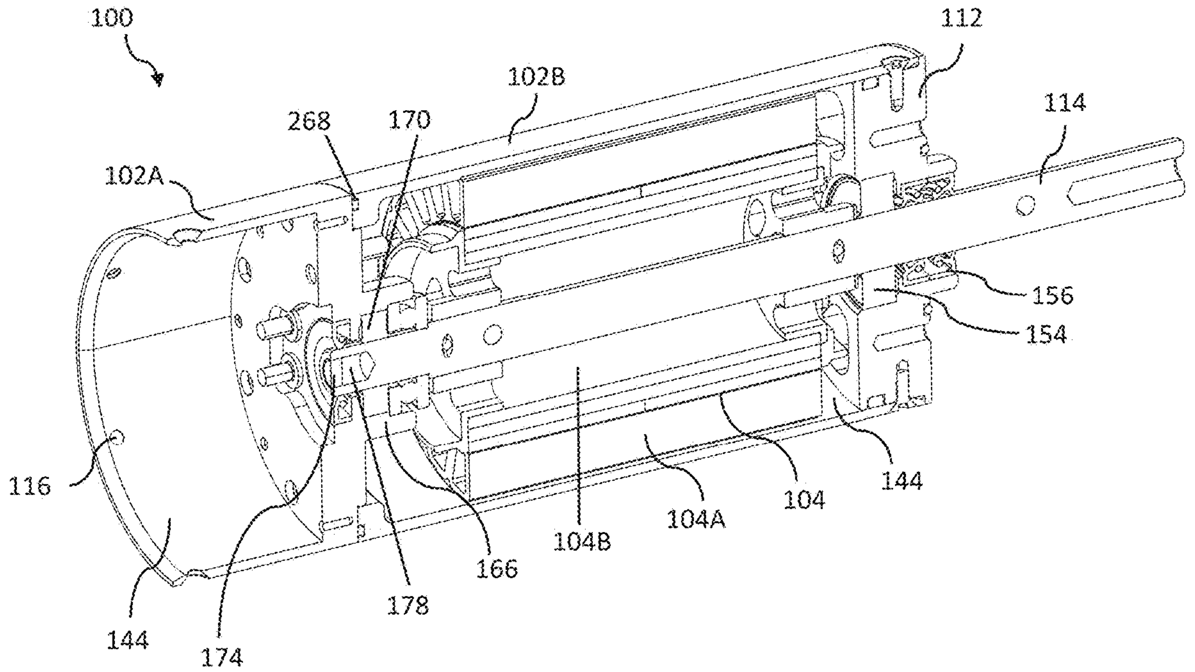
FIG. 14 is a cross-sectional view of the propulsion pod of FIG. 12 in a non-exploded configuration taken along lines 14-14 of FIG. 12.

With respect to FIGS. 12-14, a propulsion unit 100 is shown according to a second embodiment. The propulsion unit 100 of this second embodiment is similar in many respects to the prolusion pod of the first embodiment discussed above, the differences being highlighted in the following discussion. As shown, the housing 102 is formed of two portions 102A and 102B. The first portion 102A contains the ESC 106 and the second portion 102B contains the motor 104. The first portion 102A of the housing 102 is formed integrally with the internal wall 160.

The first portion 102A and the second portion 102B may be joined together with fasteners that extend through hole s 260 of the internal wall 160 and into hole s 262 formed in a rim 264 of the second portion 102B. The rim 264 of the second portion 102B may further include a groove 266 into which a seal 268 (e.g., an O-ring or X-ring) may be positioned. When the first portion 102A and the second portion 102B are fastened together with fasteners, the seal 268 forms a fluid tight seal between the first portion 102A and 102B preventing fluid from entering the housing 102.

Figure 17:
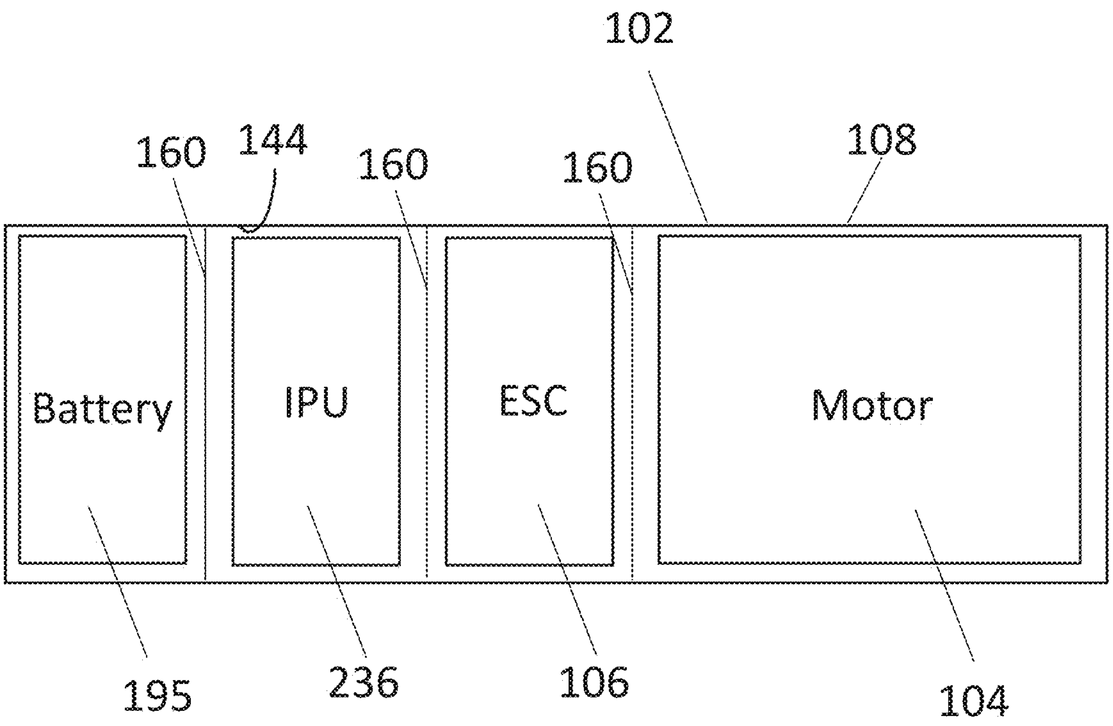
FIG. 17 is a block diagram of a propulsion pod according to another embodiment housing the battery.

In other embodiments, such as that shown in FIG. 17, the propulsion unit 100 may further include a battery 195 and the IPU 236 within the housing 102. The IPU 236 may include a battery management system for monitoring the health and status of the battery. The housing 102 may include additional internal walls 160 defining compartments within the housing 102 for the battery and IPU 236. The components of the battery and the IPU 236 that generate significant amounts of heat may be mounted proximate the internal surface 144 of the outer wall 108 and/or be mounted to the internal wall 160. In some forms, an antenna may be mounted at the top end of the strut 304 proximate the board 305. The antenna may facilitate communication with the wire less handheld controller of the rider. A communication wire may extend from the antenna to the propulsion unit 100. The IPU 236 may determine to operate the motor 104 based on the controls received from the rider via the antenna. In this form, the hydrofoil 302 may contain all of the electrical components and be configured to be attached to a board or flotation portion 305 to form the hydrofoiling watercraft. In some forms, the board or flotation portion 305 include no electronics, with all electronics of the watercraft included in the hydrofoil 302 or propulsion unit 100, and, in some embodiments, only in the propulsion unit 100.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A passively cooled waterproof propulsion unit for a watercraft, the propulsion unit comprising:
a substantially cylindrical housing including an outer wall having an external surface and an internal surface, the cylindrical housing including a first end cap attached at a first end of the housing, the first end cap including an attachment interface configured to be mounted to a strut of a watercraft such that at least a portion of the external surface of the outer wall of the housing is configured to contact a fluid surrounding the housing when the watercraft operates within the fluid, the housing including an internal wall extending radially inward of the outer wall;
an electric motor disposed within the housing; and
an electronic speed controller electrically coupled to the electric motor and configured to provide electrical power to the electric motor to operate the electric motor, the electronic speed controller including a circuit board and a plurality of transistors mounted to a first side of the circuit board and positioned within the housing such that the plurality of transistors are at an outer edge of the circuit board proximate the internal surface of the outer wall of the housing, the circuit board including a plurality of thermally conductive vias adjacent the plurality of transistors that extend through the circuit board from the first side to a second side of the circuit board opposite the first side, the second side of the circuit board positioned against the internal wall.

2. The propulsion unit of claim 1 wherein the internal wall defines a first compartment and a second compartment within the housing, the first compartment containing the electronic speed controller and the second compartment containing the motor, wherein a portion of a shaft of the motor extends through the internal wall into the first compartment.

3. The propulsion unit of claim 2 further comprising a seal disposed between the shaft of the motor and the internal wall to form a fluid tight seal between the first compartment and the second compartment.

4. The propulsion unit of claim 2 wherein the circuit board includes a thermally conductive layer affixed to the second side of the circuit board and in thermal contact with the internal wall of the housing.

5. The propulsion unit of claim 1 wherein the electric motor further comprises:
a rotor and
a stator with an outer portion in thermal contact with the internal surface of the outer wall of the housing.

6. The propulsion unit of claim 1 further comprising:
an end-cap seal disposed between the housing and the first end cap configured to prevent fluid from entering the housing
at least one hole disposed within the first end cap for receiving a conductor;
a conductor disposed within the at least one hole within the first end cap; and
a conductor seal disposed within the at least one hole of the first end cap, the conductor seal configured to form a fluid tight seal between the conductor and the first end cap.

7. The propulsion unit of claim 6 further comprising:
a conductor cable having a threaded attachment end with a seal;
threads formed within the at least one hole of the first end cap for attachment to the conductor cable attachment end;
wherein the seal of the conductor cable forms a fluid tight barrier between the first end cap and the conductor cable upon attachment of the attachment end to the first end cap.

8. The propulsion unit of claim 1 further comprising a sensor mounted to the housing for detecting a distance between the propulsion unit and a surface of the fluid in which the watercraft is operating.

9. The propulsion unit of claim 8 wherein the sensor is at least one of an ultrasonic sensor and a radar sensor.

10. The propulsion unit of claim 1 further comprising one or more hydrofoil wing mounted to the housing.

11. The propulsion unit of claim 1 further comprising:
a movable control surface disposed on the external surface of the outer wall; and
an actuator disposed within the housing and operably coupled to the movable control surface to adjust a position of the movable control surface.

12. The propulsion unit of claim 1 further comprising a battery disposed within the housing.

13. The propulsion unit of claim 1 wherein the circuit board is substantially circular, wherein the plurality of transistors are mounted at an outer edge of the substantially circular circuit board of the electronic speed controller.

14. The propulsion unit of claim 1 wherein the electric motor includes a shaft extending through a second end cap attached at a second end of the housing and further comprising a seal disposed between the shaft and the second end cap of the housing configured to inhibit fluid from entering the housing.

15. The propulsion unit of claim 1 wherein the circuit board is substantially circular, wherein the electronic speed controller includes a second circuit board having a plurality of bulk motor capacitors and which is substantially circular, the second circuit board being concentric with the circuit board having the plurality of transistors.

16. The propulsion unit of claim 1 wherein the housing includes a first cylindrical portion and second cylindrical portion, the first cylindrical portion configured to be attached the second cylindrical portion, wherein the first cylindrical portion contains the electronic speed controller and the second cylindrical portion houses the electric motor.

17. An electric watercraft comprising:
a flotation portion;
a strut having an upper end coupled to the flotation portion;
a waterproof propulsion system mounted to the strut and including a housing containing an electric motor and an electronic speed controller;
the electric motor having a shaft and a magnet, the magnet secured to an end portion of the shaft;
the electronic speed controller positioned adjacent an end of the electric motor and electrically coupled to the electric motor and configured to provide electrical power to the electric motor to operate the electric motor; and
a sensor mounted to a circuit board of the electronic speed controller and configured to capture data associated with the orientation of the magnet coupled to the shaft of the electric motor, the sensor providing the data to the electronic speed controller via an electrical pathway of the circuit board,
wherein the electronic speed controller is configured to determine a rotational position of the shaft based on the data from the sensor, the electronic speed controller configured to adjust the electrical power provided to the electric motor based at least in part on the rotational position of the shaft.

18. The electric watercraft of claim 17 wherein the electronic speed controller includes a plurality of transistors mounted to a first side of the circuit board, the circuit board including a plurality of thermally conductive vias configured to conduct heat to a second side of the circuit board and away from the plurality of transistors.

19. The electric watercraft of claim 18 wherein the sensor is mounted to the second side of the circuit board.

20. The electric watercraft of claim 18 wherein the circuit board is substantially circular and the plurality of transistors are mounted about the periphery of the circuit board.

21. The electric watercraft of claim 17 wherein the electronic speed controller includes a plurality of transistors, wherein the housing includes at least an outer wall, and wherein the electronic speed controller is positioned within the housing such that the plurality of transistors are proximal to an internal surface of the outer wall of the housing.

22. The electric watercraft of claim 21 wherein at least a portion of an external surface of the outer wall of the housing is configured to be in contact with a fluid when the electric watercraft operates within the fluid.

23. The electric watercraft of claim 17 wherein the housing includes an internal wall and the circuit board is mounted to the internal wall of the housing.

24. The electric watercraft of claim 23 further comprising a thermally conductive pad positioned between the circuit board and the internal wall.

25. The electric watercraft of claim 23 wherein the end portion of the shaft extends through the internal wall of the housing.

26. The electric watercraft of claim 17 wherein the shaft is formed of a non-magnetic material.

27. The electric watercraft of claim 17 wherein the end portion of the shaft defines a cavity, the magnet at least partially disposed in the cavity of the shaft.

28. The electric watercraft of claim 17 wherein the sensor is axially aligned with the shaft of the electric motor.

29. An electric watercraft comprising:

a flotation portion;

a strut having an upper end coupled to the flotation portion;

a waterproof propulsion system mounted to the strut and including a housing containing an electric motor and an electronic speed controller;

the electric motor having a shaft, the shaft including a magnet coupled thereto;

the electronic speed controller positioned adjacent an end of the electric motor and electrically coupled to the electric motor and configured to provide electrical power to the electric motor to operate the electric motor; and a sensor mounted to a circuit board of the electronic speed controller and configured to capture data associated with the orientation of the magnet coupled to the shaft of the electric motor, the sensor providing the data to the electronic speed controller via an electrical pathway of the circuit board, wherein the electronic speed controller is configured to determine a rotational position of the shaft based on the data from the sensor, the electronic speed controller configured to adjust the electrical power provided to the electric motor based at least in part on the rotational position of the shaft, wherein the housing includes an internal wall and the circuit board is mounted to the internal wall of the housing, further comprising a thermally conductive pad positioned between the circuit board and the internal wall, wherein the end portion of the shaft includes a cavity and the magnet is disposed within the cavity.

* * * * *